US011343422B2

(12) United States Patent
Sakurabu

(10) Patent No.: US 11,343,422 B2
(45) Date of Patent: *May 24, 2022

(54) FOCUSING CONTROL DEVICE, FOCUSING CONTROL METHOD, FOCUSING CONTROL PROGRAM, LENS DEVICE, AND IMAGING DEVICE

(71) Applicant: FUJIFILM Corporation, Tokyo (JP)

(72) Inventor: Hitoshi Sakurabu, Saitama (JP)

(73) Assignee: FUJIFILM Corporation, Tokyo (JP)

(*) Notice: Subject to any disclaimer, the term of this patent is extended or adjusted under 35 U.S.C. 154(b) by 8 days.

This patent is subject to a terminal disclaimer.

(21) Appl. No.: 17/008,658

(22) Filed: Sep. 1, 2020

(65) Prior Publication Data

US 2020/0393644 A1 Dec. 17, 2020

Related U.S. Application Data

(63) Continuation of application No. 16/238,527, filed on Jan. 3, 2019, now Pat. No. 10,802,245, which is a
(Continued)

(30) Foreign Application Priority Data

Jul. 6, 2016 (JP) .............................. JP2016-134314

(51) Int. Cl.
*H04N 5/232* (2006.01)
*G03B 13/36* (2021.01)
(Continued)

(52) U.S. Cl.
CPC ......... *H04N 5/232122* (2018.08); *G02B 7/09* (2013.01); *G02B 7/34* (2013.01);
(Continued)

(58) Field of Classification Search
None
See application file for complete search history.

(56) References Cited

U.S. PATENT DOCUMENTS

| 4,734,571 | A | 3/1988 | Hamada et al. | |
| 10,802,245 | B2* | 10/2020 | Sakurabu | ................. G02B 7/09 |

(Continued)

FOREIGN PATENT DOCUMENTS

| CN | 1514297 | 7/2004 |
| CN | 101088038 | 12/2007 |

(Continued)

OTHER PUBLICATIONS

"International Search Report (Form PCT/ISA/210) of PCT/JP2017/016822," dated Jul. 4, 2017, with English translation thereof, pp. 1-5.
(Continued)

*Primary Examiner* — Timothy J Henn
*Assistant Examiner* — Wesley J Chiu
(74) *Attorney, Agent, or Firm* — JCIPRNET

(57) ABSTRACT

A focusing control device includes: a sensor that has a focus detection area in which a plurality of first signal detection sections which receives one of a pair of luminous fluxes passing through different portions arranged in one direction of a pupil region of an imaging optical system including a focus lens and detects signals and a plurality of second signal detection sections which receives other one of the pair of luminous fluxes and detects signals are formed; and a processor, configured to obtain correlation values, obtain an accumulative value of the correlation values included in each of a plurality of division areas obtained by dividing a graph of the correlation values in which shift amounts are represented on a first axis in a direction of the first axis, and
(Continued)

perform focusing control by controlling the focus lens based on the accumulative value obtained.

23 Claims, 18 Drawing Sheets

Related U.S. Application Data continuation of application No. PCT/JP2017/016822, filed on Apr. 27, 2017.

(51) Int. Cl.
    *H04N 5/369* (2011.01)
    *H04N 9/04* (2006.01)
    *G02B 7/34* (2021.01)
    *G02B 7/09* (2021.01)

(52) U.S. Cl.
    CPC ......... *G03B 13/36* (2013.01); *H04N 5/36961* (2018.08); *H04N 9/045* (2013.01)

(56) References Cited

U.S. PATENT DOCUMENTS

| | | | |
|---|---|---|---|
| 2005/0031330 A1 | 2/2005 | Nonaka et al. | |
| 2005/0129393 A1 | 6/2005 | Mihara et al. | |
| 2005/0185084 A1 | 8/2005 | Nonaka et al. | |
| 2008/0198257 A1* | 8/2008 | Morimoto | G03B 13/00 348/345 |
| 2008/0240699 A1 | 10/2008 | Ichimiya et al. | |
| 2008/0309771 A1* | 12/2008 | Takahashi | G03B 13/32 348/208.4 |
| 2009/0238551 A1 | 9/2009 | Ichimiya et al. | |
| 2010/0013947 A1* | 1/2010 | Oikawa | G03B 13/36 348/222.1 |
| 2013/0258168 A1 | 10/2013 | Aoki | |
| 2014/0204231 A1 | 7/2014 | Takahara | |
| 2014/0320610 A1* | 10/2014 | Oigawa | H04N 13/239 348/47 |
| 2015/0365584 A1 | 12/2015 | Samurov et al. | |
| 2016/0105600 A1 | 4/2016 | Omata et al. | |
| 2016/0301855 A1* | 10/2016 | Imade | G02B 7/34 |
| 2016/0381285 A1 | 12/2016 | Aoki et al. | |
| 2017/0208271 A1 | 7/2017 | Hasegawa | |
| 2018/0224629 A1 | 8/2018 | Sakurabu | |
| 2018/0249065 A1 | 8/2018 | Takahara | |

FOREIGN PATENT DOCUMENTS

| | | |
|---|---|---|
| JP | S62103615 | 5/1987 |
| JP | 2005043256 | 2/2005 |
| JP | 2011142464 | 7/2011 |
| JP | 2013025144 | 2/2013 |
| JP | 2013057839 | 3/2013 |
| JP | 2013218082 | 10/2013 |
| JP | 2014215506 | 11/2014 |
| WO | 2015146229 | 10/2015 |

OTHER PUBLICATIONS

"Written Opinion of the International Searching Authority (Form PCT/ISA/237) of PCT/JP2017/016822," dated Jul. 4, 2017, with English translation thereof, pp. 1-7.

"Office Action of U.S. Appl. No. 16/238,527", dated Mar. 13, 2020, pp. 1-20.

"Notice of allowance of U.S. Appl. No. 16/238,527", dated Jun. 4, 2020, pp. 1-11.

"Office Action of China Counterpart Application", dated Jul. 20, 2020, with English translation thereof, p. 1-p. 11.

\* cited by examiner

FOCUSING CONTROL DEVICE, FOCUSING CONTROL METHOD, FOCUSING CONTROL PROGRAM, LENS DEVICE, AND IMAGING DEVICE

CROSS REFERENCE TO RELATED APPLICATION

This is a continuation of U.S. patent application Ser. No. 16/238,527 filed on Jan. 3, 2019, which is a continuation of International Application No. PCT/JP2017/016822 filed on Apr. 27, 2017, and claims priority from Japanese Patent Application No. 2016-134314 filed on Jul. 6, 2016, the entire disclosures of which are incorporated herein by reference.

BACKGROUND OF THE INVENTION

1. Field of the Invention

The present invention relates to a focusing control device, a focusing control method, a computer readable medium storing a focusing control program, a lens device, and an imaging device.

2. Description of the Related Art

In recent years, with an increase in resolution of imaging elements, such as a charge coupled device (CCD) image sensor and a complementary metal oxide semiconductor (CMOS) image sensor, there is a rapid increase in demand for information devices having an imaging function, such as a digital still camera, a digital video camera, and a mobile phone with a camera. The information devices having an imaging function described above are referred to as imaging devices.

In these imaging devices, a phase difference auto focus (AF) method is employed as a focusing control method which focuses on a main subject.

JP2013-025144A describes an imaging device that performs focusing control through the phase difference AF method by using phase difference detection pixels formed on a light reception surface of the imaging element.

SUMMARY OF THE INVENTION

In the phase difference AF method, outputs of a pair of pixel rows for phase difference detection present in the focus detection area set on the light reception surface of the imaging element are input as data items, and correlation calculation for calculating correlation values of the pair of data items is obtained.

Specifically, the data items of one pixel row is A[1], . . . , and A[k], the data items of the other pixel row are B[1], . . . , and B[k]. An area S[d] surrounded by two data waveforms obtained by the following expression in a case where the two data items are shifted in one direction as a target of the phase difference detection by a shift amount of "d" is obtained as a correlation value.

"L" in Expression (1) is a predetermined value. The value of the shift amount of "d" with which the minimum value of the area S[d] is determined as a phase difference amount, and a focus lens is driven based on the phase difference amount.

[Expression 1]

$$S[d] = \sum_{n=1}^{k} (A[n+d] - B[n])^2 \quad (1)$$

$$d = -L, \ldots, -2, -1, 0, 1, 2, \ldots, L$$

However, in the graph of the area S[d] represented by using the shift amount d as a lateral axis, there is a plurality of inflection points convex downwards in some cases, and there is a plurality of candidates at which the correlation value is the minimum value in this case.

For example, in a case where a periodical pattern such as a subject having a streak pattern is captured, the area S[d] repeatedly increases or decreases, and thus, there is a possibility that the minimum value will be erroneously determined.

In a case where there is a plurality of candidates at which the correlation value is the minimum value, there are some cases where the minimum value is changed due to a little noise, and there is also a possibility that the minimum value will be erroneously determined in this case.

JP2013-025144A does not disclose a method of improving determination precision of the minimum value of the correlation values.

The invention has been made in view of such circumstances, and an object of the invention is to provide a focusing control device, a focusing control method, a focusing control program, a lens device, and an imaging device capable of improving focusing accuracy through a phase difference AF method.

A focusing control device according to the invention comprises a sensor that has a plurality of first signal detection sections which receives one of a pair of luminous fluxes passing through different portions arranged in one direction of a pupil region of an imaging optical system including a focus lens and detects signals and a plurality of second signal detection sections which receives the other one of the pair of luminous fluxes and detects signals are formed, and a processor, configured to obtain correlation values between a first signal group output from the plurality of first signal detection sections and a second signal group output from the plurality of second signal detection sections for different shift amounts while shifting the first signal group and the second signal group in the one direction by arbitrary amounts, obtain an accumulative value of the correlation values included in each of a plurality of division areas obtained by dividing a graph of the correlation values in which the shift amounts are represented on a first axis in a direction of the first axis, and perform focusing control by controlling the focus lens based on the accumulative value obtained.

A focusing control method according to the invention comprises obtaining correlation values between a first signal group output from a plurality of first signal detection sections, which receives one of a pair of luminous fluxes passing through different portions arranged in one direction of a pupil region of an imaging optical system including a focus lens and detects signals, and a second signal group output from a plurality of second signal detection sections, which receives the other one of the pair of luminous fluxes and detects signals, for different shift amounts while shifting the first signal group and the second signal group in one direction by arbitrary amounts, the plurality of first signal detection sections and the plurality of second signal detection sections being formed in a focus detection area of a sensor, obtaining an accumulative value of the correlation values included in each of a plurality of division areas obtained by dividing a graph of the correlation values in which the shift amounts are represented on a first axis in a direction of the first axis, and performing focusing control by controlling the focus lens based on the accumulative value obtained.

A focusing control program according to the invention causes a computer to perform obtaining correlation values between a first signal group output from a plurality of first signal detection sections, which receives one of a pair of luminous fluxes passing through different portions arranged in one direction of a pupil region of an imaging optical system including a focus lens and detects signals, and a second signal group output from a plurality of second signal detection sections, which receives the other one of the pair of luminous fluxes and detects signals, for different shift amounts while shifting the first signal group and the second signal group in one direction by arbitrary amounts, the plurality of first signal detection sections and the plurality of second signal detection sections being formed in a focus detection area of a sensor, obtaining an accumulative value of the correlation values included in each of a plurality of division areas obtained by dividing a graph of the correlation values in which the shift amounts are represented on a first axis in a direction of the first axis, and performing focusing control by controlling the focus lens based on the accumulative value obtained.

A lens device according to the invention comprises the focusing control device, and an imaging optical system including a focus lens for causing light to be incident on the sensor.

An imaging device according to the invention comprises the focusing control device.

According to the invention, it is possible to provide a focusing control device, a focusing control method, a focusing control program, a lens device, and an imaging device capable of improving focusing accuracy through a phase difference AF method.

DESCRIPTION OF THE PREFERRED EMBODIMENTS

Figure 1:
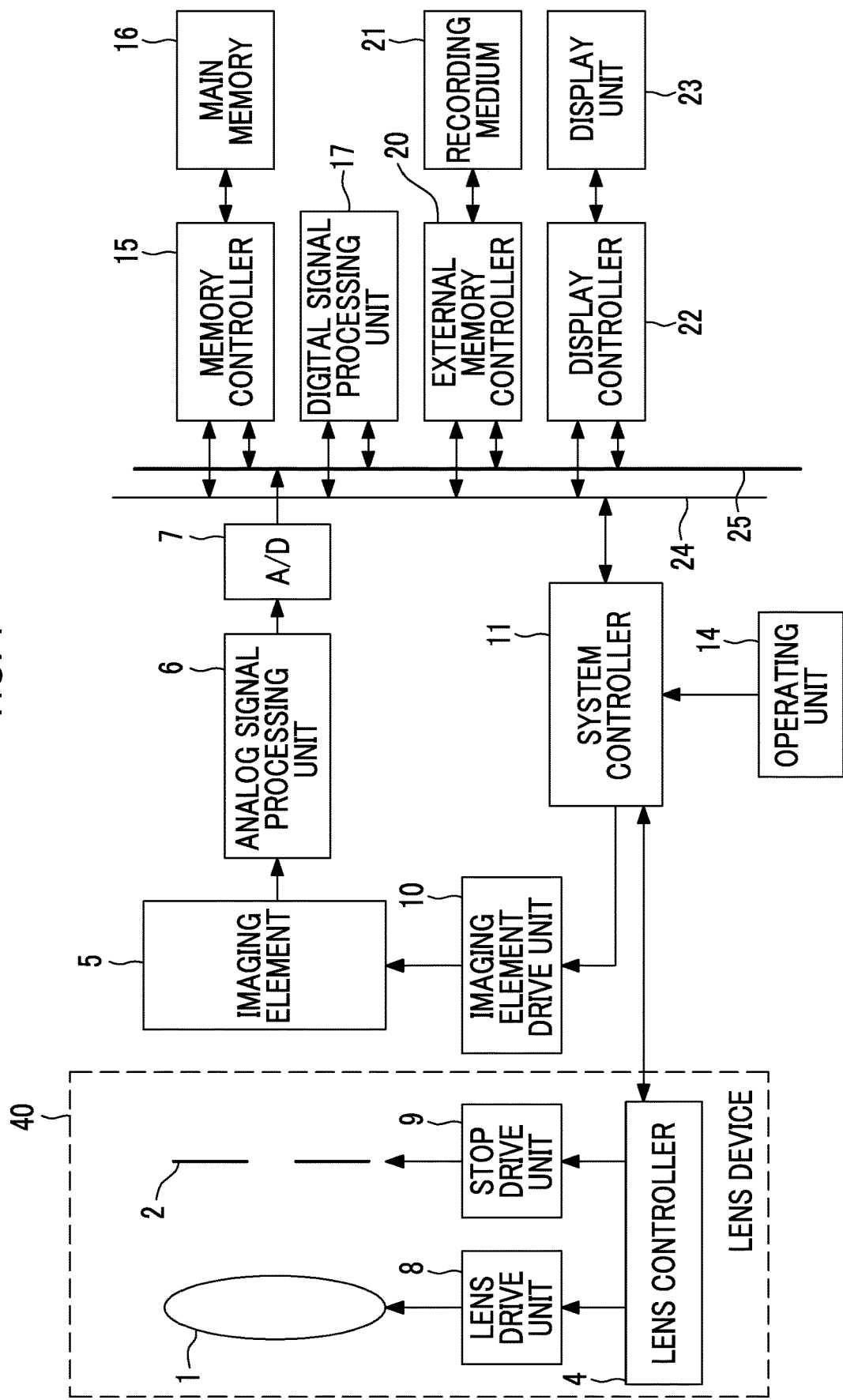
FIG. 1 is a diagram showing a schematic configuration of a digital camera as an example of an imaging device for describing an embodiment of the invention.

Hereinafter, an embodiment of the invention will be described by referring to the drawings.

FIG. 1 is a diagram showing the schematic configuration of a digital camera as an example of an imaging device for describing an embodiment of the invention.

The digital camera shown in FIG. 1 includes a lens device 40 which includes an imaging lens 1, a stop 2, a lens controller 4, a lens drive unit 8, and a stop drive unit 9.

Although it has been described in the present embodiment that the lens device 40 is attachably and detachably provided at a digital camera main body, the lens device may be fixed to the digital camera main body.

The imaging lens 1 and the stop 2 constitute an imaging optical system, and the imaging optical system includes at least a focus lens.

The focus lens is a lens for adjusting a focus of the imaging optical system, and is composed of a single lens or a plurality of lenses. The focus lens moves in an optical axis direction of the imaging optical system, and thus, the focus adjustment is performed.

A liquid lens capable of changing a focus position by performing variable control on a curved surface of the lens may be used as the focus lens.

The lens controller 4 of the lens device 40 is able to communicate with a system controller 11 of a digital camera main body in a wired or wireless manner.

The lens controller 4 drives the focus lens included in the imaging lens 1 through the lens drive unit 8 or drives the stop 2 through the stop drive unit 9 according to a command from the system controller 11.

The digital camera main body includes an imaging element 5 which images a subject through the imaging optical system, such as a CCD type or a CMOS type, an analog signal processing unit 6 which is connected to an output of the imaging element 5 and performs analog signal processing such as correlative double sampling processing, and an analog-to-digital conversion circuit 7 which converts the analog signal output from the analog signal processing unit 6 into a digital signal.

The analog signal processing unit 6 and the analog-to-digital conversion circuit 7 are controlled by the system controller 11.

The system controller 11 that generally controls the entire electric control system of the digital camera drives the imaging element 5 through an imaging element drive unit 10, and outputs a subject image captured through the lens device 40, as captured image signals. A command signal from a user is input to the system controller 11 through an operating unit 14.

The system controller 11 includes various processors and a memory such as a random access memory (RAM) or a read only memory (ROM).

The various processors include a central processing unit (CPU) which is a general-purpose processor that performs various processing by executing a program, a programmable logic device (PLD) which is a processor capable of changing a circuit configuration after a field programmable gate array (FPGA) is manufactured, or a dedicated electric circuit which is a processor having a circuit configuration designed as a dedicated circuit in order to perform specific processing such as application specific integrated circuit (ASIC).

More specifically, the configurations of the various processors are electric circuits obtained by combining circuit elements such as semiconductor elements.

The system controller 11 may be constituted by one among various processors, or may be constituted by a combination of the same kind or different kinds of two or more processors (for example, a combination of a plurality of FPGAs or a combination of a CPU and an FPGA).

The system controller 11 realizes functions to be described below by a processor which is executing a focusing control program stored in a built-in ROM.

The electric control system of the digital camera includes the main memory 16, a memory controller 15 which is connected to the main memory 16, a digital signal processing unit 17 which generates captured image data by performing interpolation calculation, gamma correction calculation, RGB/YC conversion processing, and the like on the captured image signals output from the analog-to-digital conversion circuit 7, an external memory controller 20 to which an attachable and detachable recording medium 21 is connected, and a display controller 22 to which a display unit 23 mounted on a camera rear surface or the like is connected.

The memory controller 15, the digital signal processing unit 17, the external memory controller 20, and the display controller 22 are connected to one another by a control bus 24 and a data bus 25, and are controlled according to commands from the system controller 11.

Figure 2:
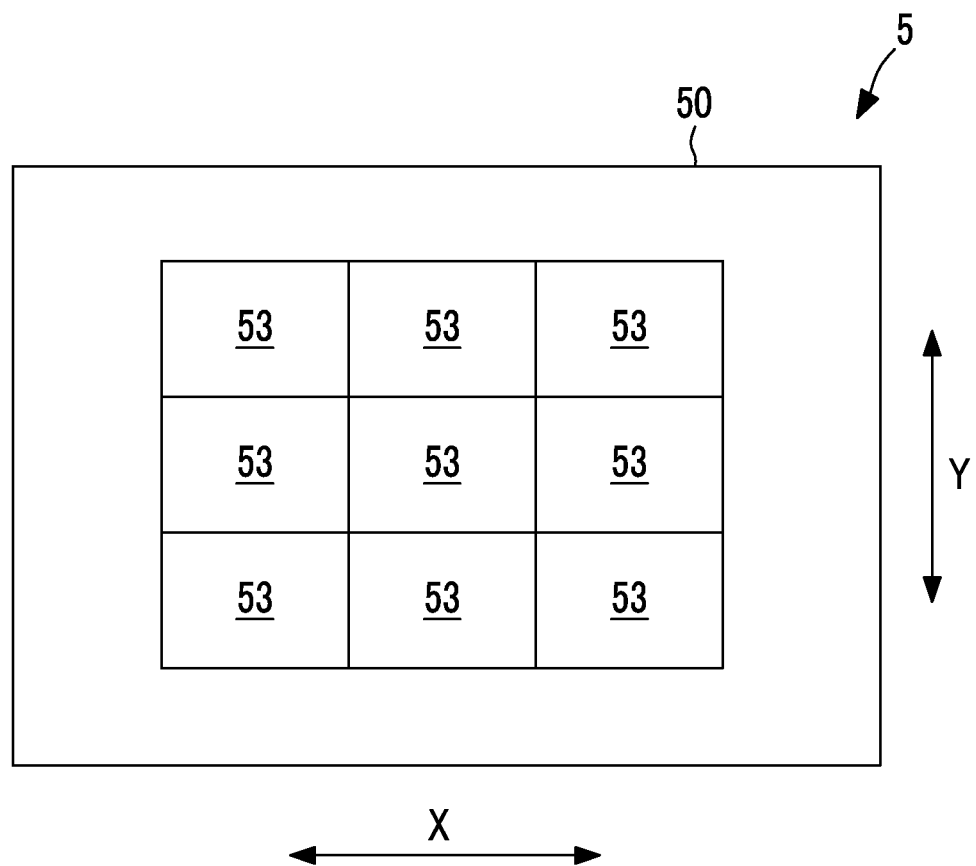
FIG. 2 is a schematic plan view showing the entire configuration of an imaging element 5 mounted on the digital camera shown in FIG. 1.

FIG. 2 is a schematic plan view showing the entire configuration of the imaging element 5 mounted on the digital camera shown in FIG. 1.

The imaging element 5 includes a light reception surface 50 on which a plurality of pixels arranged in two dimensions in a row direction X which is one direction and a column direction Y perpendicular to the row direction X are arranged.

Nine focus detection areas (hereinafter, referred to as AF areas) 53 that are areas as targets to be in focus are formed on the light reception surface 50 in the example of FIG. 2.

The AF area 53 is an area including imaging pixels and phase difference detection pixels, as pixels.

Only the imaging pixels are arranged in portions other than AF areas 53 on the light reception surface 50. The AF areas 53 may be formed on the light reception surface 50 without gaps.

Figure 3:
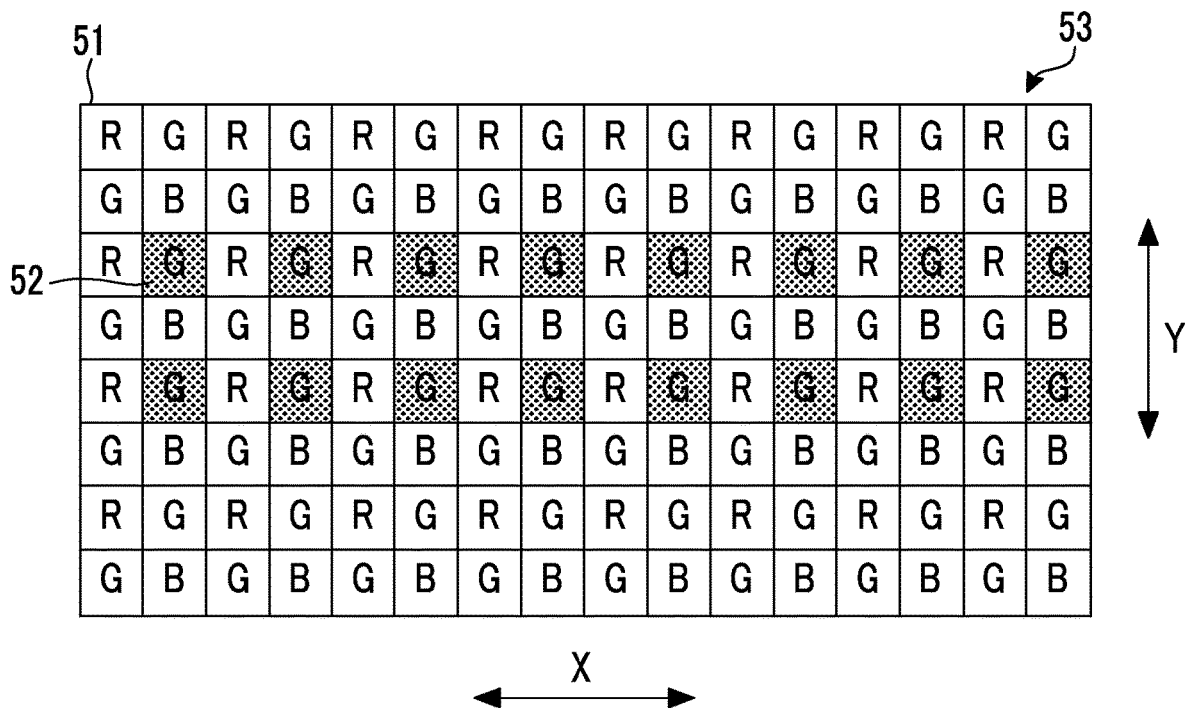
FIG. 3 is a partial enlarged view of one AF area 53 shown in FIG. 2.

FIG. 3 is a partial enlarged view of one AF area 53 shown in FIG. 2.

Pixels 51 are arranged in two dimensions in the AF area 53. The pixel 51 includes a photoelectric conversion section such as a photodiode and a color filter formed in the photoelectric conversion section.

In FIG. 3, pixels 51 (referred to as R pixels 51) each including a color filter (R filter) that transmits red light are assigned a character of "R".

Pixels 51 (referred to as G pixels 51) each including a color filter (G filter) that transmits green light are assigned a character of "G".

Pixels 51 (referred to as B pixels 51) each including a color filter (B filter) that transmits blue light are assigned a character of "B". The arrangement of the color filters is a Bayer array on the entire light reception surface 50.

In the AF area 53, some (hatched pixels 51 in FIG. 3) of the G pixels 51 are phase difference detection pixels 52.

In the example of FIG. 3, the G pixels 51 in a predetermined pixel row among the pixel rows including the R pixels 51 and the G pixels 51 and G pixels 51 which are closest to the G pixels 51 in the column direction Y and have the same color as that of the G pixels are the phase difference detection pixels 52.

Figure 4:
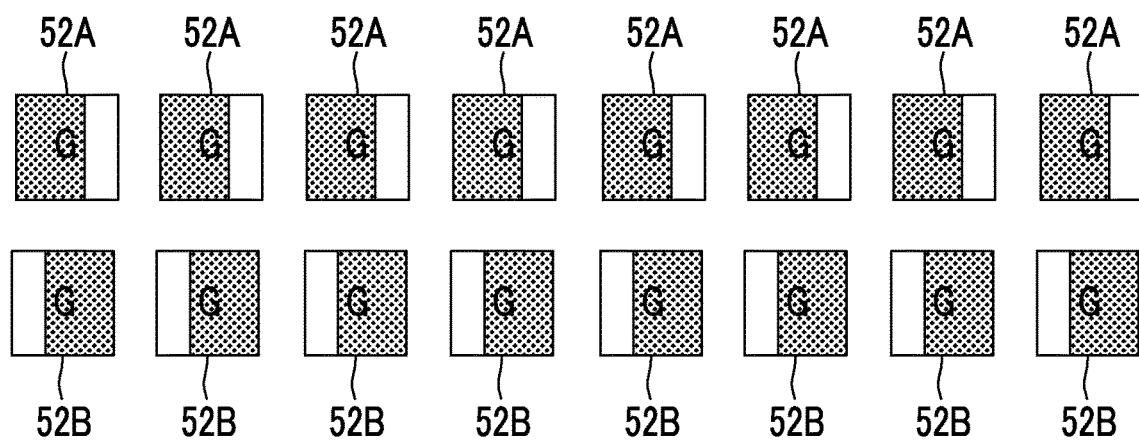
FIG. 4 is a diagram showing only phase difference detection pixels 52 shown in FIG. 3.

FIG. 4 is a diagram showing only the phase difference detection pixels 52 shown in FIG. 3.

As shown in FIG. 4, the phase difference detection pixels 52 includes two kinds of pixels such as phase difference detection pixels 52A and phase difference detection pixels 52B.

The phase difference detection pixel 52A is a first signal detection section which receives one of a pair of luminous fluxes passing through two different portions arranged in the row direction X of a pupil region of the imaging optical system, and detects a signal corresponding to a light reception amount.

The phase difference detection pixel 52B is a second signal detection section which receives the other one of the pair of luminous fluxes, and detects a signal corresponding to a light reception amount.

In the AF area 53, the plurality of pixels 51 other than the phase difference detection pixels 52A and 52B is the imaging pixels, and the imaging pixels receive a pair of luminous fluxes passing through the imaging lens 1, and detect signals corresponding to light reception amounts.

A light shielding film is formed on the photoelectric conversion sections of the pixels 51, and openings that prescribe light reception areas of the photoelectric conversion sections are formed in the light shielding film.

A center of the opening of the imaging pixel 51 matches a center of the photoelectric conversion section of the imaging pixel 51. In contrast, the center of the opening (a white portion of FIG. 4) of the phase difference detection pixel 52A is shifted to the right side from the center of the photoelectric conversion section of the phase difference detection pixel 52A.

The center of the opening (a white portion in FIG. 4) of the phase difference detection pixel 52B is shifted to the left side from the center of the photoelectric conversion section of the phase difference detection pixel 52B. The right side mentioned herein is one side in the row direction X shown in FIG. 3, and the left side is the other side in the row direction X.

Figure 5:
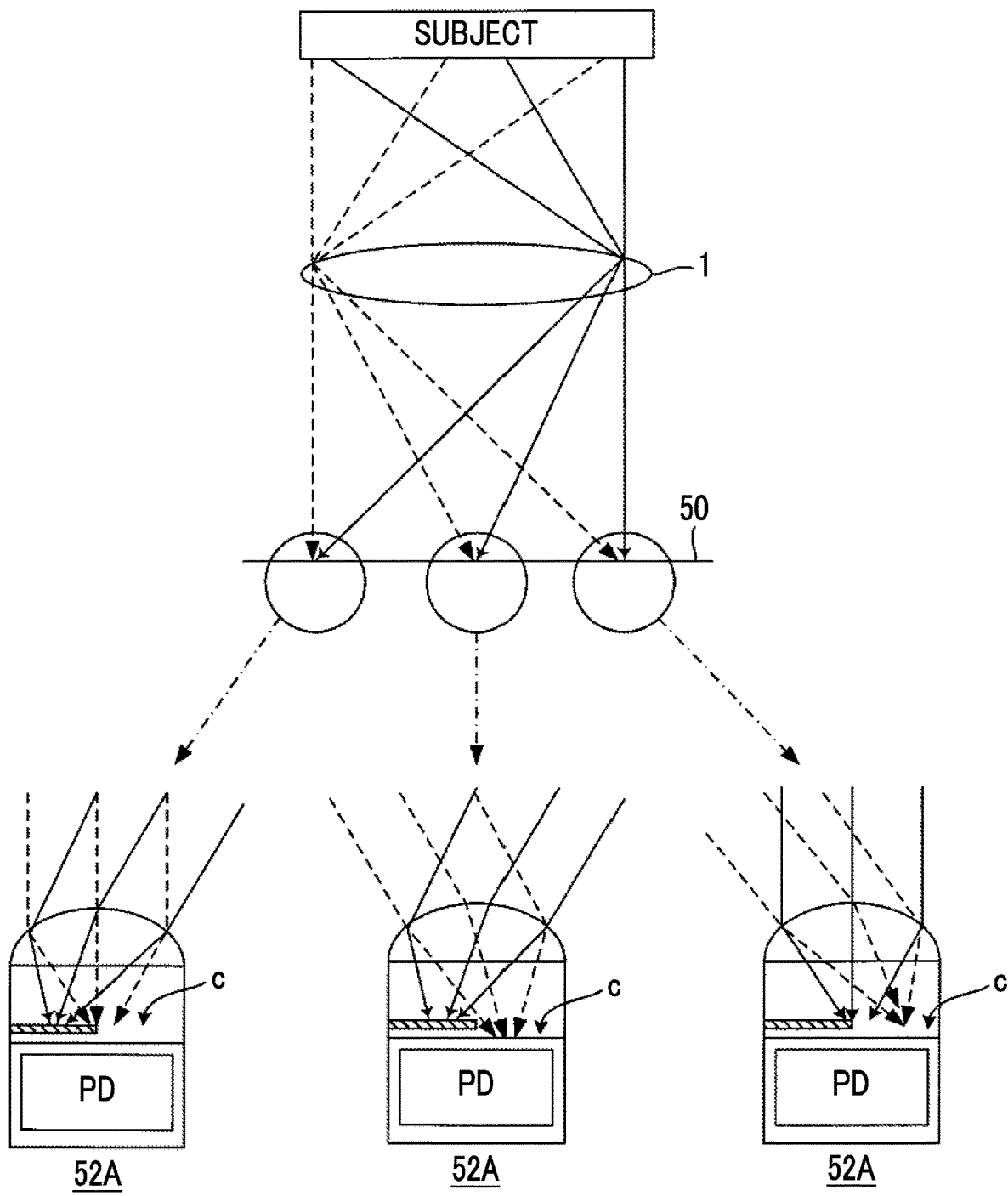
FIG. 5 is a diagram showing a cross-sectional configuration of a phase difference detection pixel 52A.

FIG. 5 is a diagram showing a cross-sectional configuration of the phase difference detection pixel 52A. As shown in FIG. 5, an opening c of the phase difference detection pixel 52A is shifted to the right side from the photoelectric conversion section (PD).

As shown in FIG. 5, the one side of the photoelectric conversion section is covered with the light shielding film, and thus, light rays incident from a side opposite to the side covered with the light shielding film are selectively shielded.

With this configuration, it is possible to detect a phase difference between images captured by these two pixel groups, which include one pixel group including the phase difference detection pixels 52A present in a predetermined row and the other pixel group including the phase difference detection pixels 52B arranged on one side of the phase difference detection pixels 52A of the one pixel group at the same distance, in the row direction X.

The imaging element 5 may include a plurality of pairs each including the first signal detection section that receives one of the pair of luminous fluxes passing through the different portions arranged in the row direction X of the pupil region of the imaging optical system and detects the signal corresponding to the light reception amount and the second signal detection section that receives the other one of the pair of luminous fluxes and detects the signal corresponding to the light reception amount, and is not limited to the configuration shown in FIGS. 2 to 5.

For example, all the pixels included in the imaging element 5 may be the imaging pixels 51. The imaging pixel 51 may be divided into two. One divided portion may be the phase difference detection pixel 52A, and the other divided portion may be the phase difference detection pixel 52B.

Figure 6:
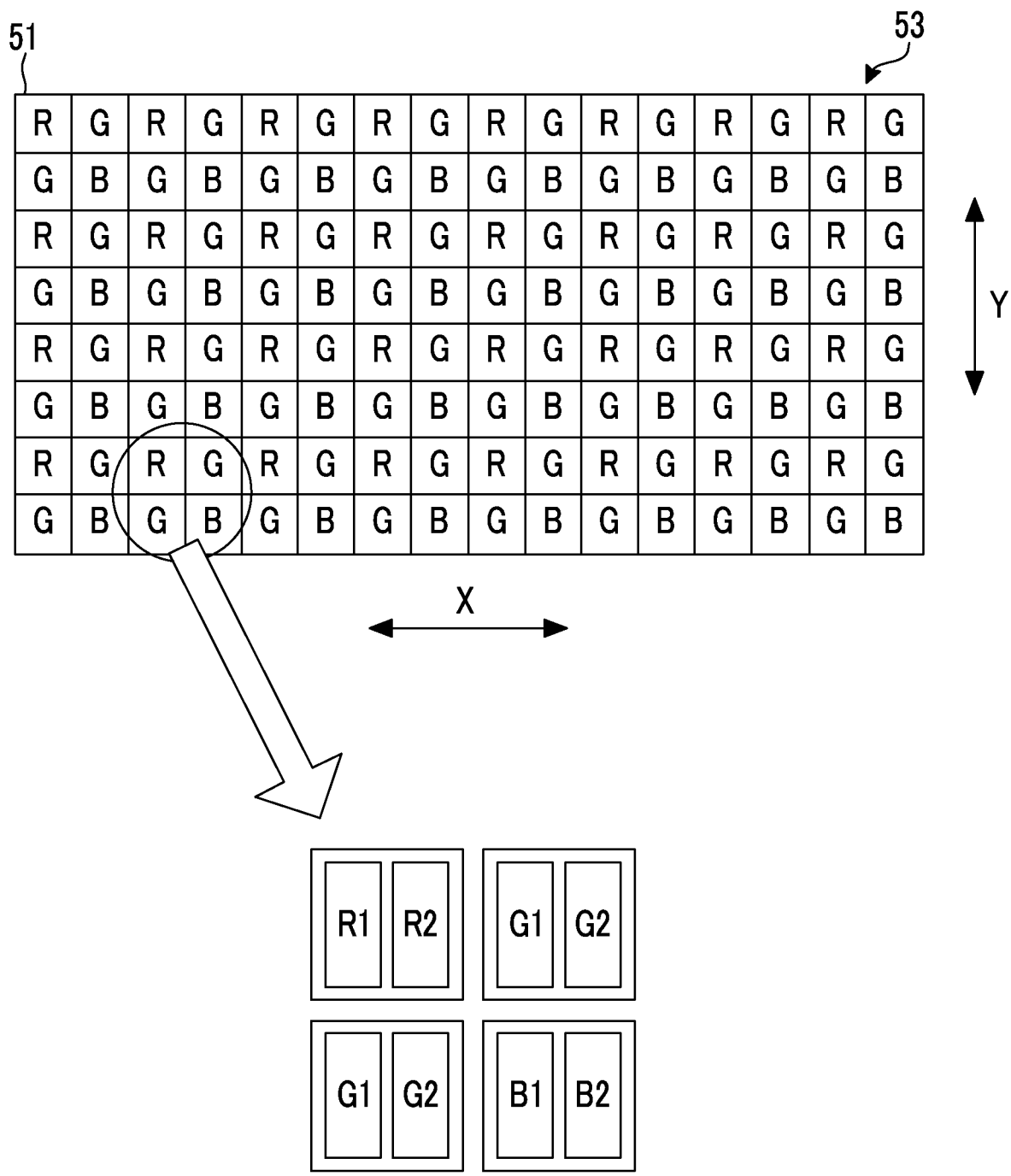
FIG. 6 is a diagram showing a configuration in which all pixels included in an imaging element 5 are imaging pixels 51 and each imaging pixel 51 is divided into two.

FIG. 6 is a diagram showing a configuration in which all the pixels included in the imaging element 5 are the imaging pixels 51 and the imaging pixels 51 are divided into two division portions.

In the configuration of FIG. 6, the imaging pixel 51 assigned a character of R in the imaging element 5 is divided into two, and two divided portions are a phase difference detection pixel R1 and a phase difference detection pixel R2.

The imaging pixel 51 assigned a character of G in the imaging element 5 is divided into two, and two divided portions are a phase difference detection pixel G1 and a phase difference detection pixels G2.

The imaging pixel 51 assigned to a character of B in the imaging element 5 is divided into two, and two divided portions are a phase difference detection pixel B1 and a phase difference detection pixels B2.

In this configuration, the phase difference detection pixels R1, G1, and B1 are the first signal detection sections, and the phase difference detection pixels R2, G2, and B2 are the second signal detection sections. The signals may be independently read out of the first signal detection sections and the second signal detection sections.

In a case where the signals of the first signal detection sections and the second signal detection sections are added, typical imaging signals having no phase difference are acquired. That is, in the configuration of FIG. 6, all the pixels may be used as both of the phase difference detection pixels and the imaging pixels.

As stated above, the imaging element 5 constitutes a sensor having an AF area in which the plurality of first signal detection sections and the plurality of second signal detection sections are formed.

Figure 7:
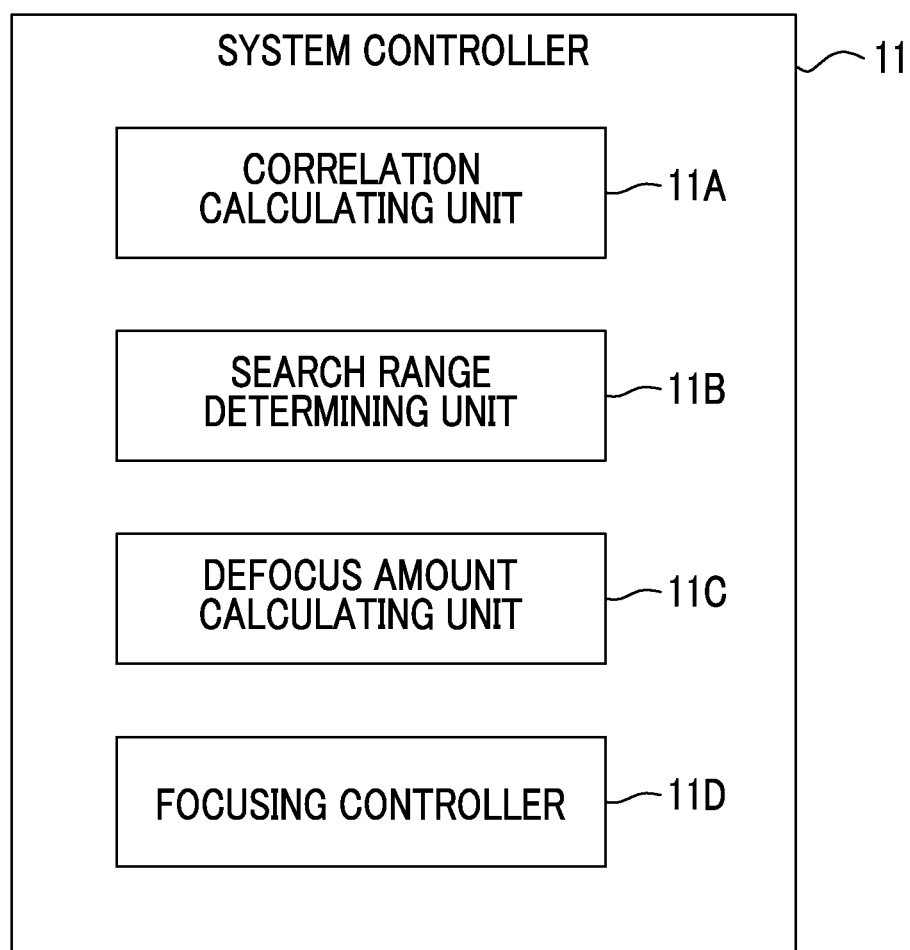
FIG. 7 is a functional block diagram of a system controller 11 shown in FIG. 1.

FIG. 7 is a functional block diagram of the system controller 11 shown in FIG. 1.

The system controller 11 functions as a correlation calculating unit 11A, a search range determining unit 11B, a defocus amount calculating unit 11C, and a focusing controller 11D by a processor which is executing a focusing control program stored in the built-in ROM. The system controller 11 constitutes a focusing control device.

The correlation calculating unit 11A acquires correlation values between a first signal group output from the plurality of first signal detection sections (phase difference detection pixels 52A) and a second signal group output from the plurality of second signal detection sections (phase difference detection pixels 52B) which are present in the entire area of the selected AF area 53.

For example, the calculation of Expression (1) is performed by setting the first signal group as data A[k] and the second signal group as data B[k], and thus, the correlation calculating unit 11A acquires the correlation values (S[d]) between the first signal group and the second signal group for each different shift amount.

The correlation values between the first signal group and the second signal group are minimum values in a case where degrees of matching between the first signal group and the second signal group are the highest. The lower the degrees of matching, the larger the values.

The method of calculating the correlation values is not limited to Expression (1), and another calculation method may be used.

Figure 8:
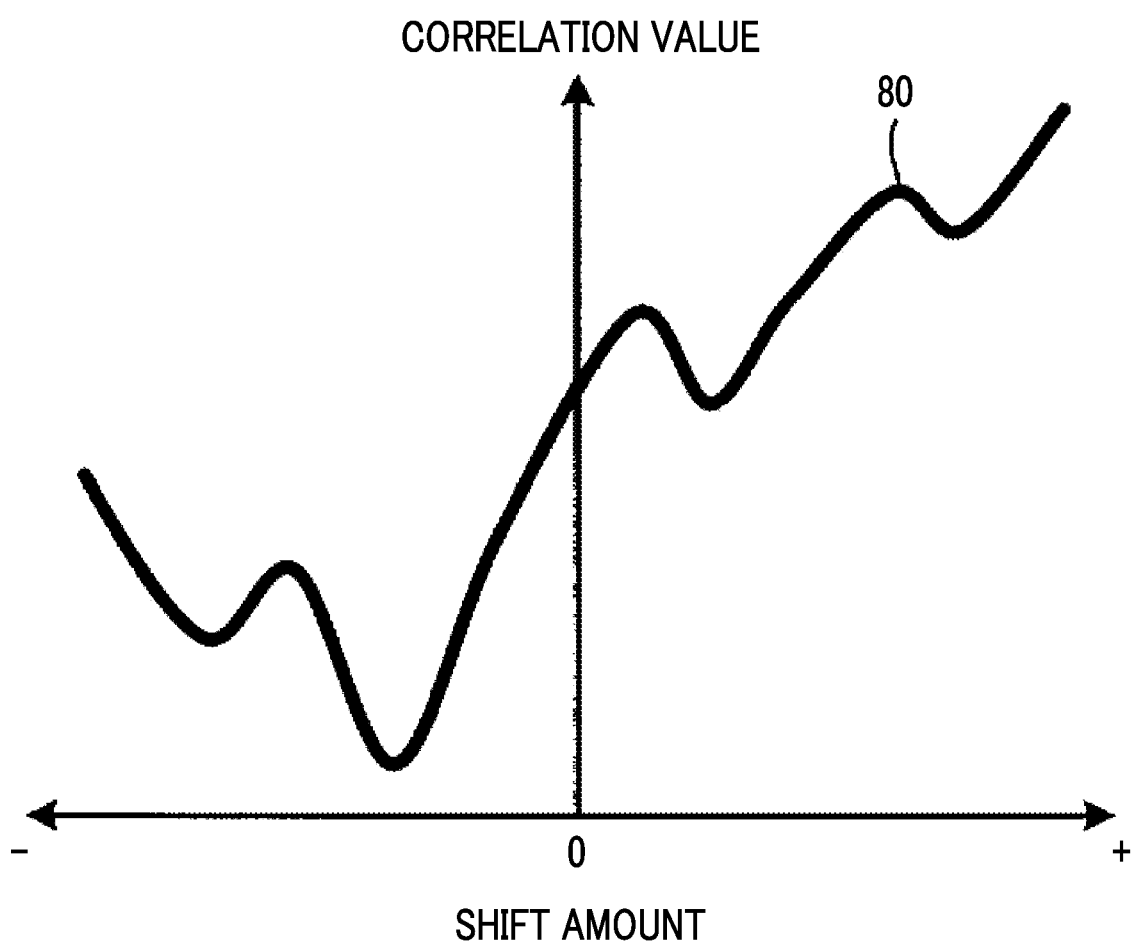
FIG. 8 is a graph showing an example of a correlation curve obtained through correlation calculation.

FIG. 8 is a graph showing an example of a correlation curve obtained through the correlation calculation.

The correlation curve is a graph in which a lateral axis which is a first axis is a shift amount and the correlation values S[d] for the respective shift amounts obtained by Expression (1) are represented. FIG. 8 represents a correlation curve 80.

The search range determining unit 11B obtains an accumulative value of the correlation values included in each of division areas obtained by dividing the correlation curve into M (M is a natural number of two or more) in a direction of the lateral axis (hereinafter, referred to as a lateral-axis direction), and determines a search range which is a range in which a minimum value of the correlation values of the correlation curve is used as a searching target based on the accumulative value.

Figure 9:
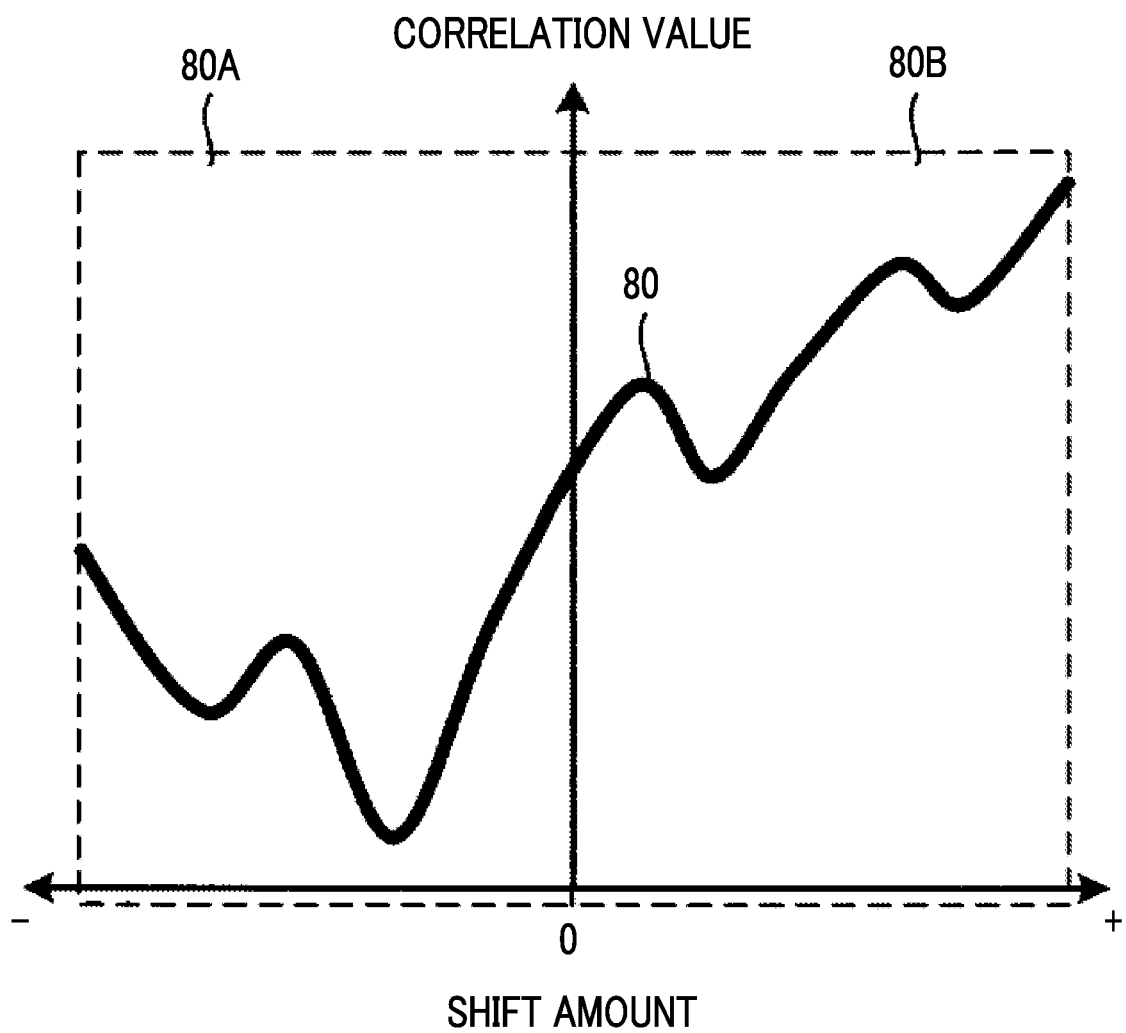
FIG. 9 is a schematic graph showing an example of a method of dividing the correlation curve.

FIG. 9 is a schematic graph showing an example of the method of dividing the correlation curve.

FIG. 9 shows a case where M is "2", and the correlation curve is divided into a division area 80A and a division area 80B in the lateral-axis direction.

The boundary between the division area 80A and the division area 80B is located at a position of shift amount=0, and the widths of the division area 80A and the division area 80B in the lateral-axis direction are the same.

The division area 80A indicates a range from a minimum value of the shift amount on a minus side to the position of shift amount=0. The division area 80B indicates a range from a maximum value of the shift amount on a plus side to the position of shift amount=0.

The search range determining unit 11B calculates an accumulative value of correlation values corresponding to shift amounts belonging to each division area for each of M number of division areas. The search range determining unit 11B determines the division area of which the accumulative value is equal to or less than a threshold value TH, among the M number of division areas, as the search range.

In this example, a value which is slightly larger than a minimum value of the accumulative values obtained for the M number of division areas is set as the threshold value TH.

For example, a value obtained by multiplying a coefficient α (for example, "1.05" or "1.1") larger than 1 by the minimum value of the accumulative values is set as the threshold value TH.

The defocus amount calculating unit 11C searches for the minimum value of the correlation curve within the search range by analyzing the correlation curve within the search range determined by the search range determining unit 11B.

Initially, the defocus amount calculating unit 11C determines whether or not the correlation value corresponding to a predetermined shift amount d(n) within the search range is an inflection point at which the correlation curve changes from decreasing to increasing.

For example, the defocus amount calculating unit 11C extracts the correlation values corresponding to a total of five shift amounts, which include the predetermined shift amount d(n), a shift amount d(n+1) which is the first shift amount from the predetermined shift amount d(n) on the plus side in the lateral-axis direction, a shift amount d(n+2) which is the second shift amount from the predetermined shift amount d(n) on the plus side in the lateral-axis direction, a shift amount d(n−1) which is the first shift amount from the predetermined shift amount d(n) on the minus side in the lateral-axis direction, and a shift amount d(n−2) which is the second shift amount from the predetermined shift amount d(n) on the minus side in the lateral-axis direction.

Hereinafter, it is assumed that the defocus amount calculating unit 11C uses the correlation value corresponding to the shift amount d(n) as a candidate of the minimum value (hereinafter, referred to as a minimum value candidate) of the correlation curve in a case where all the following conditions (1) to (3) are satisfied.

(1) The correlation value corresponding to the shift amount d(n+1) and the correlation value corresponding to the shift amount d(n−1) are larger than the correlation value corresponding to the shift amount d(n). (2) The correlation value corresponding to the shift amount d(n+2) is larger than the correlation value corresponding to the shift amount d(n+1). (3) The correlation value corresponding to the shift amount d(n−2) is larger than the correlation value corresponding to the shift amount d(n−1).

The defocus amount calculating unit 11C determines whether or not all the correlation values within the search range are minimum value candidates, and finally determines the smallest value of the correlation values determined as the minimum values candidates, as the minimum value.

The shift amount corresponding to the minimum value determined in this way is a phase difference. The defocus amount calculating unit 11C calculates a defocus amount based on the phase difference.

In this example, in order to determine the minimum value candidates (inflection points), a total of five correlation values which include the correlation value as the determining target and two correlation values on the left and right sides of the correlation value as the determining target in the lateral-axis direction are used.

However, the defocus amount calculating unit may determine whether or not a total of three correlation values which include the correlation value as the determining target and two correlation values on the left and right sides of the correlation value as the determining target in the lateral-axis direction are the minimum value candidates (inflection points).

The defocus amount calculating unit may determine whether or not the correlation value as the determining target and three or more correlation values on the left and right sides of the correlation value as the determining target in the lateral-axis direction are the minimum value candidates (inflection points).

The focusing controller 11D performs focusing control for moving the focus lens to a target position by controlling the lens controller 4 based on the defocus amount calculated by the defocus amount calculating unit 11C.

In a case where the focus lens is the liquid lens, the focusing controller performs the focusing control for focusing the focus position on the target position by controlling the curved surface of the focus lens based on the defocus amount.

Figure 10:
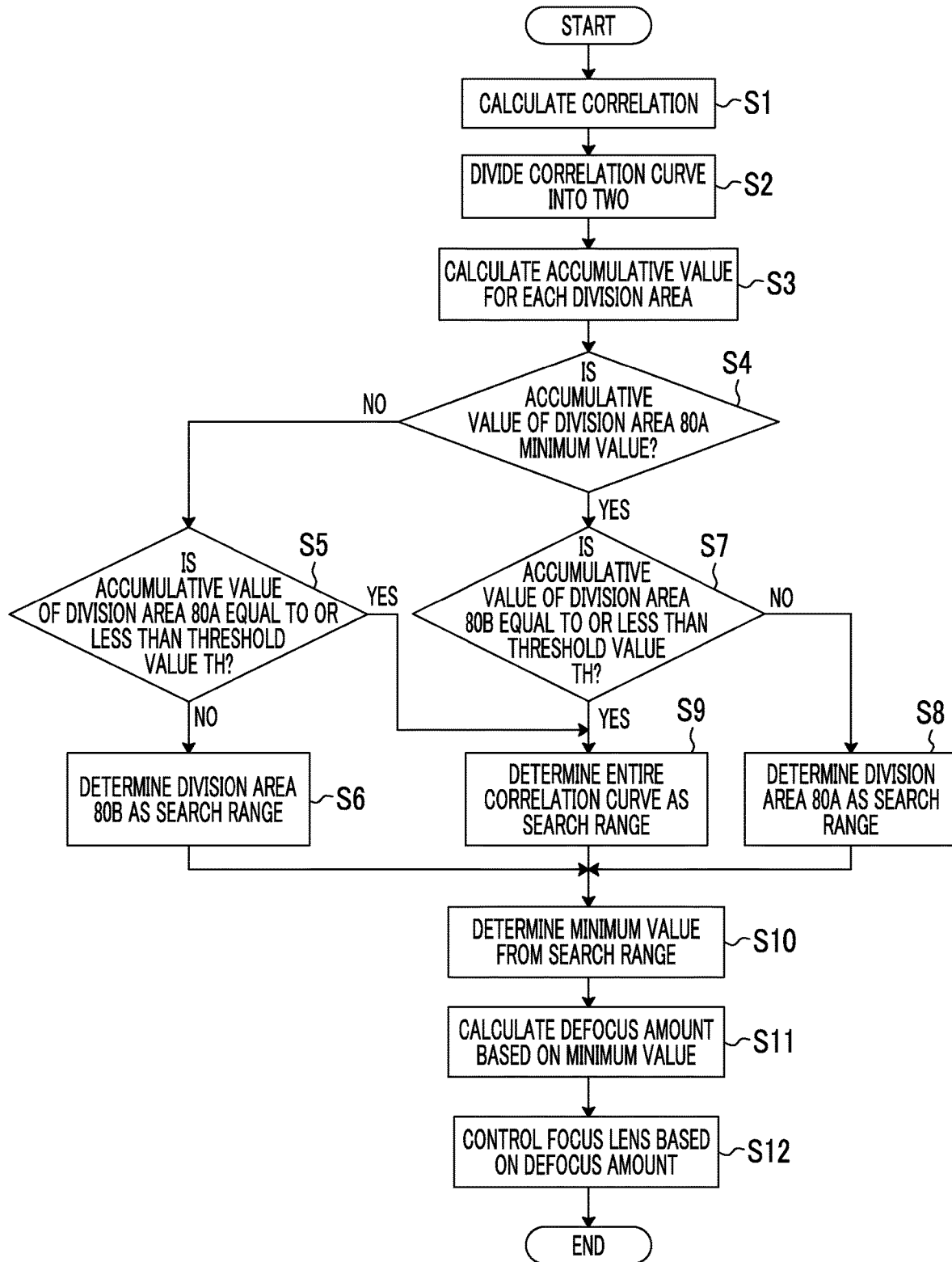
FIG. 10 is a flowchart for describing a focusing control operation using the system controller 11 shown in FIG. 7.

FIG. 10 is a flowchart for describing a focusing control operation using the system controller 11 shown in FIG. 7.

A command to perform AF is input to the system controller 11 by operating the operating unit 14 in a state in which a certain AF area is selected by a user of the digital camera from the nine AF areas 53, and thus, the flow shown in FIG. 10 is started.

In a case where the command to perform AF is input, the imaging for AF is performed by the imaging element 5, and the captured image signals acquired through the imaging are input to the system controller 11.

The correlation calculating unit 11A acquires the correlation values between the first signal group and the second signal group for different shift amounts by performing correlation calculation of the first signal group output from the phase difference detection pixels 52A and the second signal group output from the phase difference detection pixels 52B which are included in the selected AF area 53 among the captured image signals (step S1). Step S1 constitutes a correlation calculating step.

Subsequently, the search range determining unit 11B equally divides the correlation curve obtained through the correlation calculation of step S1 into two in the lateral-axis direction as illustrated in FIG. 9 (step S2).

Subsequently, the search range determining unit 11B calculates the accumulative value of the correlation values included in each of the division area 80A and the division area 80B obtained by dividing the correlation curve into two (step S3).

Subsequently, the search range determining unit 11B determines the minimum value of the accumulative value calculated for the division area 80A and the accumulative value calculated for the division area 80B.

The search range determining unit 11B sets the value obtained by multiplying the determined minimum value by the coefficient α, as the threshold value TH.

The search range determining unit 11B performs the process of step S7 in a case where the accumulative value calculated for the division area 80A is the minimum value (step S4: YES), and performs the process of step S5 in a case where the accumulative value calculated for the division area 80B is the minimum value (step S4: NO).

In step S5, the search range determining unit 11B determines whether or not the accumulative value calculated for the division area 80A is equal to or less than the threshold value TH.

In step S7, the search range determining unit 11B determines whether or not the accumulative value calculated for the division area 80B is equal to or less than the threshold value TH.

A case where the determination results of step S5 and step S7 are YES is a case where both the accumulative value calculated for the division area 80A and the accumulative value calculated for the division area 80B are equal to or less than the threshold value TH.

Accordingly, in a case where the determination results of step S5 and step S7 are YES, the search range determining unit 11B determines the entire correlation curve (the division area 80A and the division area 80B) obtained through the correlation calculation of step S1, as the search range (step S9).

A case where the determination result of step S5 is NO is a case where only the accumulative value calculated for the division area 80B is equal to or less than the threshold value TH. Accordingly, in a case where the determination result of step S5 is NO, the search range determining unit 11B determines the division area 80B as the search range (step S6).

A case where the determination result of step S7 is NO is a case where only the accumulative value calculated for the division area 80A is equal to or less than the threshold value TH. Accordingly, in a case where the determination result of step S7 is NO, the search range determining unit 11B determines the division area 80A as the search range (step S8). Step S3 to step S9 constitute a search range determining step.

After step S6, step S8, or step S9, the defocus amount calculating unit 11C determines the minimum value by using the aforementioned method by using the correlation curve within the search range determined in step S6, step S8, or step S9 as the target (step S10).

In a case where the minimum value is determined, the defocus amount calculating unit 11C calculates the defocus amount based on the minimum value (step S11).

Thereafter, the focusing controller 11D performs the focusing control by controlling the focus lens based on the defocus amount calculated in step S11 (step S12). Step S12 constitutes a focusing controlling step.

As described above, according to the digital camera shown in FIG. 1, it is possible to narrow the search range in which the minimum value of the correlation curve is searched for based on the accumulative value of the correlation values for each division area.

It is possible to narrow the search range, and thus, it is possible to improve determination precision of the minimum value. Accordingly, it is possible to improve focusing precision. It is possible to narrow the search range, and thus, it is possible to reduce a processing load for searching for the minimum value. Accordingly, it is possible to perform AF at a high speed.

In a case where the number of division areas of which the accumulative value of the correlation values is equal to or less than the threshold value TH is equal to M (step S5: YES, step S7: YES), there is a possibility that the minimum value of the correlation curve will be present in all the division areas. Thus, the minimum value is searched for from the entire correlation curve, and thus, it is possible to improve the determination precision of the minimum value.

Although it has been described that M=2, in a case where M is three or more, the accumulative value of the correlation values is calculated for each of the three or more division areas, and the threshold value TH is set based on the minimum value of these accumulative values. The division area of which the accumulative value is equal to or less than the threshold value TH is determined as the search range, and the minimum value is determined within the determined search range.

As stated above, in a case where the value of M is three or more, since it is possible to further narrow the search range, it is possible to further improve the focusing precision, and it is possible to perform AF at a higher speed. Further, it is possible to reduce the processing load.

Hereinafter, modification examples of the digital camera shown in FIG. 1 will be described.

First Modification Example

The search range determining unit 11B may compare the accumulative values of the M number of division areas with each other, and may determine the division area of which the accumulative value is minimum, among the M number of division areas, as the search range. With this configuration, it is possible to necessarily narrow the search range. Thus, it is possible to acquire the aforementioned advantage of narrowing the search range.

In a case where the division area of which the accumulative value is minimum is determined as the search range as stated above, the search range determining unit 11B may determine a range which includes the determined division area, is narrower than the entire correlation curve, and is wider than the determined division area, as the search range.

For example, in a case where M=5 and the accumulative value of the division area in the middle is minimum, a range which includes the division area in the middle and division areas on the left and right side of the division area in the middle is determined as the search range. With this configuration, since it is also possible to narrow the search range, it is possible to acquire the aforementioned advantage.

Second Modification Example

In a flowchart shown in FIG. 10, in a case where the determination result of step S7 or step S5 is NO, that is, in a case where the search range is narrowed down to a narrow range, the search range determining unit 11B sets the division area determined as the search range to a candidate area which is a candidate of the search range.

The search range determining unit 11B divides the set candidate area into N (N is a natural number of two or more) in the lateral-axis direction, and calculates an accumulative value of correlation values belonging to each of the N number of division candidate areas for each division candidate area. The search range determining unit 11B further narrows down the search range among the candidate areas based on the accumulative value of each of the N number of division candidate areas.

Figure 11A:
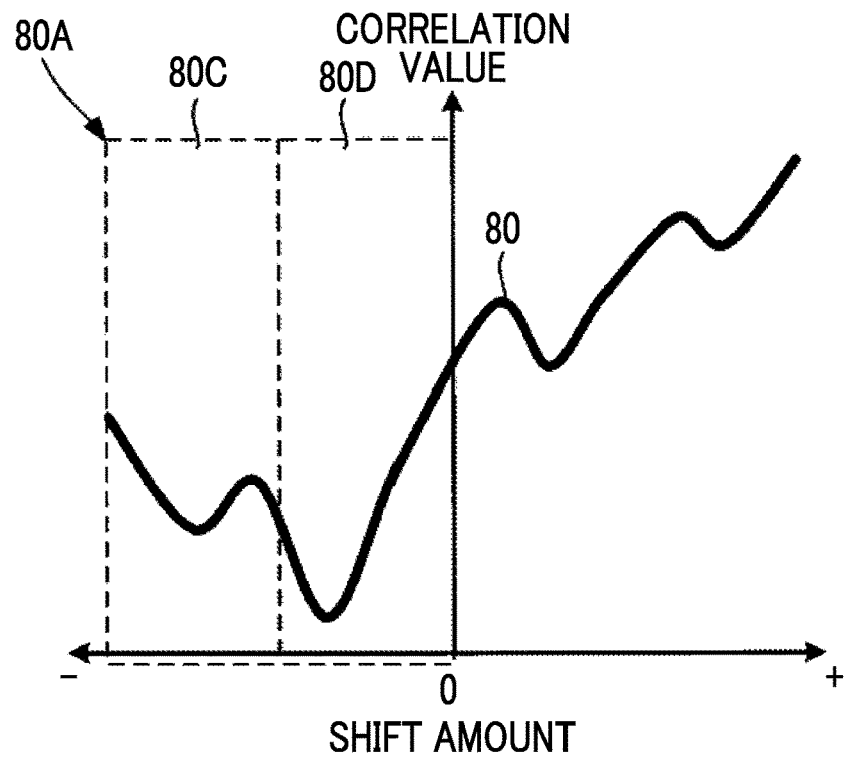
FIGS. 11A and 11B are schematic graphs for describing a state in which a division area is further divided.

For example, in a case where the correlation curve generated in step S1 is the correlation curve 80 shown in FIG. 8 and the determination result of step S7 is NO, the search range determining unit 11B sets the division area 80A of which the accumulative value is equal to or less than the threshold value TH, as the candidate area, and obtains a division candidate area 80C and a division candidate area 80D obtained by dividing the set candidate area (division area 80A) into two, as shown in FIG. 11A.

Subsequently, the search range determining unit 11B calculates an accumulative value of correlation values belonging to the division candidate area 80C and an accumulative value of correlation values belonging to the division candidate area 80D, and sets a threshold value TH2 based on a minimum value of the two accumulative values. The method of setting the threshold value TH2 is the same as the method of setting the threshold value TH.

Subsequently, the search range determining unit 11B determines the division candidate area of the division candidate area 80C and the division candidate area 80D, of which the accumulative value is equal to or less than the threshold value TH2, as the search range. The search range determining unit 11B may determine the division candidate area of the division candidate area 80C and the division candidate area 80D, of which the accumulative value is small, as the search range.

Until the entire candidate area is determined as the search range or until a width of the division candidate area in the lateral-axis direction reaches a lower limit value, the search range determining unit 11B performs processes of resetting the search range determined within the candidate area as the candidate area and determining the search range within the reset candidate area.

In a case where the entire candidate area is determined as the search range or in a case where the width of the range determined as the search range in the lateral-axis direction reaches the lower limit value, the search range determining unit 11B determines the search range determined at this point of time, as the final search range. Thereafter, the process of step S10 is performed.

For example, in the division example shown in FIG. 11A, the accumulative value of the correlation values belonging to the division candidate area 80D is sufficiently smaller than the accumulative value of the correlation values belonging to the division candidate area 80C. Thus, the division candidate area 80D is reset as the candidate area.

Figure 11B:
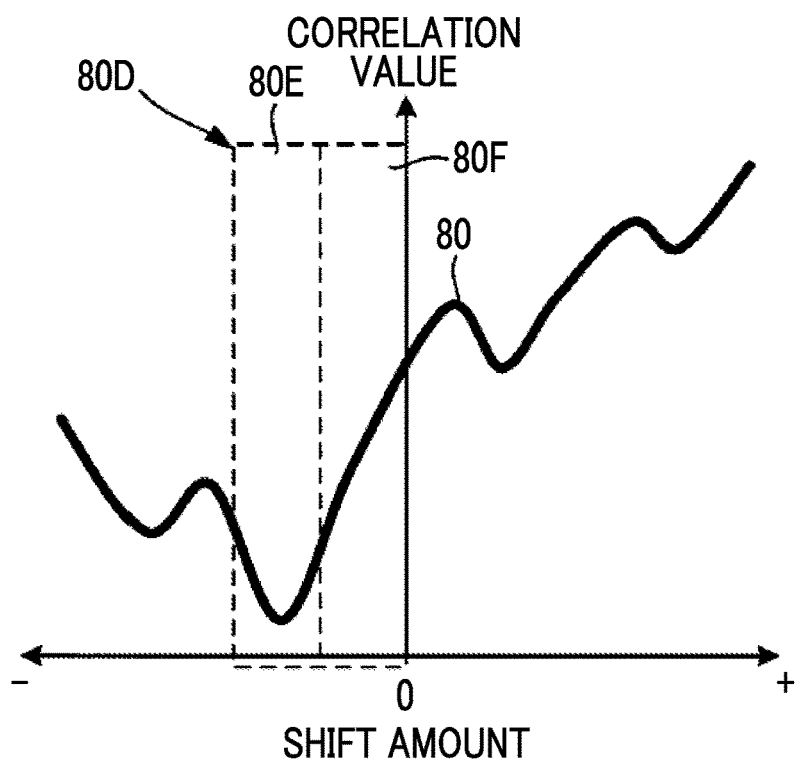

The search range determining unit 11B obtains a division candidate area 80E and a division candidate area 80F obtained by dividing the division candidate area 80D reset as the candidate area into two as shown in FIG. 11B.

The search range determining unit 11B calculates an accumulative value of correlation values belonging to the division candidate area 80E and an accumulative value of correlation values belonging to the division candidate area 80F, and sets a threshold value TH3 based on a minimum value of the two accumulative values. The method of setting the threshold value TH3 is the same as the method of setting the threshold value TH.

The search range determining unit 11B determines the division candidate area of the division candidate area 80E and the division candidate area 80F, of which the accumulative value is equal to or less than the threshold value TH3, as the search range.

Although it has been described in the example of FIG. 11B that the division candidate area 80E is reset as the candidate area, the accumulative values of the correlation values of two division candidate areas obtained by dividing the division candidate area 80E into two are approximately equal to each other. Thus, the division candidate area 80E is finally determined as the search range.

Until the entire candidate area is determined as the search range, the search range determining unit 11B repeats a series of processes of setting the candidate area, dividing the set candidate area, and determining the search range within the candidate area based on the accumulative values of the division candidate areas.

The candidate area is narrowed down in this manner, and thus, it is possible to accurately narrow down the area in which the minimum value of the correlation curve is present. Accordingly, it is possible to improve the determination precision of the minimum value.

The lower limit value of the division candidate area in the lateral-axis direction is set to have the same as the number of correlation values to be used in the determination of the inflection point, and thus, it is possible to search for the minimum value from the search range even though the division candidate area having the lower limit width is determined as the final search range.

In this modification example, the search range determining unit 11B divides the correlation curve into M number of division areas in which M is a value obtained by dividing the width of the entire correlation curve in the lateral-axis direction by the lower limit width with which the division area is capable of being set as the division candidate area, calculates accumulative values of correlation values for each of the M number of division areas, and stores the calculated accumulative values in the RAM. It is preferable that the search range determining unit 11B performs the setting of the candidate area and the determination of the search range by using the accumulative values of the M number of division areas stored in the RAM.

Figure 12:
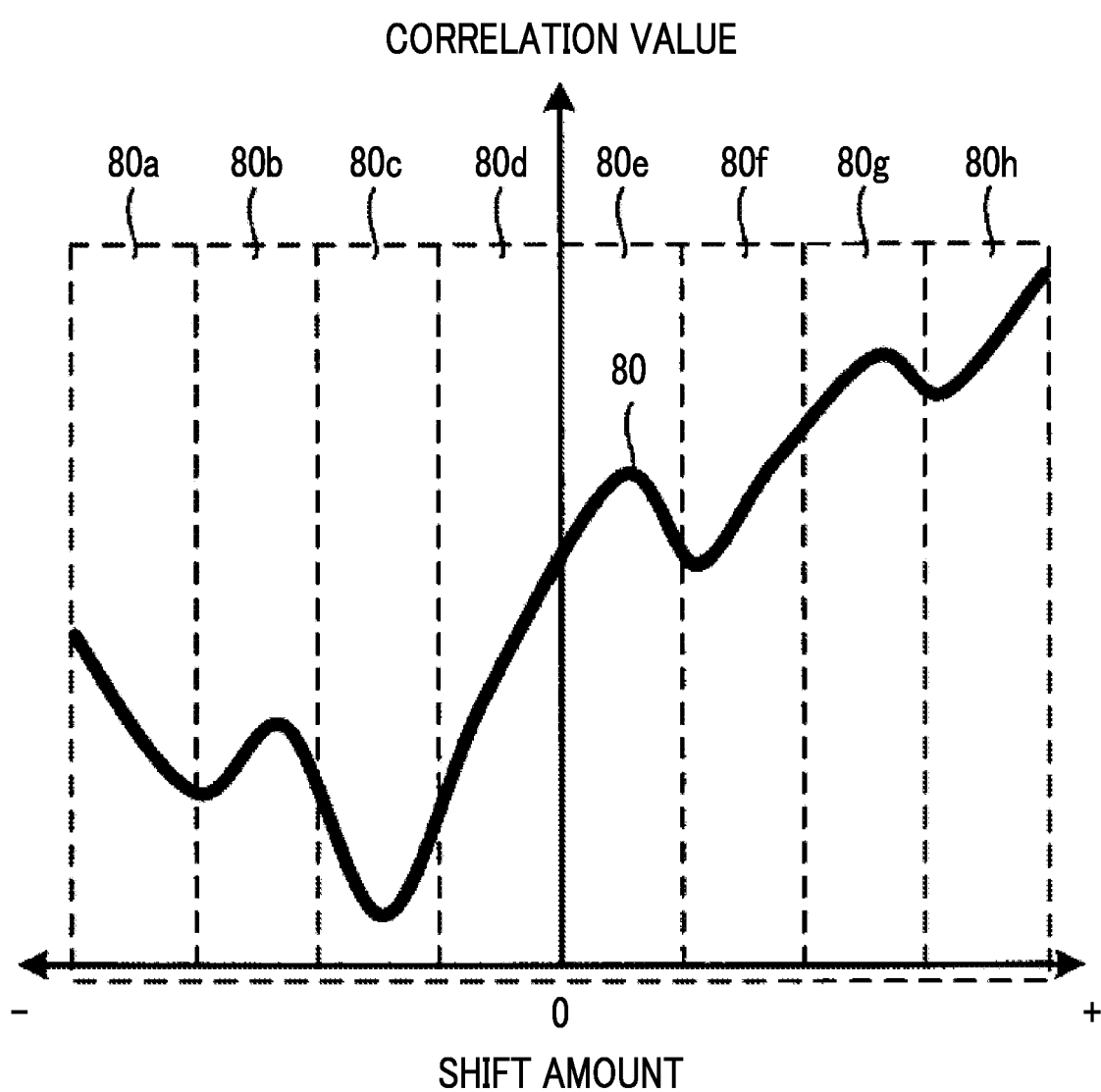
FIG. 12 is a schematic graph showing a setting example of the division area.

FIG. 12 is a schematic graph showing a setting example of the division area.

In the example of FIG. 12, the correlation curve is divided into eight areas which include a division area 80a to a division area 80h. The search range determining unit 11B calculates an accumulative value of correlation values belonging to each of the division area 80a to the division area 80h, and stores the calculated accumulative values in the RAM.

For example, the search range determining unit 11B obtains the accumulative value of the division area 80A shown in FIG. 9 by adding the accumulative values calculated for the division areas 80a to 80d.

For example, the search range determining unit 11B obtains the accumulative value of the division area 80B shown in FIG. 9 by adding the accumulative values calculated for the division areas 80e to 80h.

As stated above, the accumulative values are obtained for the respective division areas obtained by dividing the correlation curve into small areas, and are stored in the RAM. Accordingly, it is possible to calculate the accumulative value for each division area and the accumulative value for each division candidate area at a high speed. Accordingly, it is possible to perform AF at a high speed.

Third Modification Example

Figure 13:
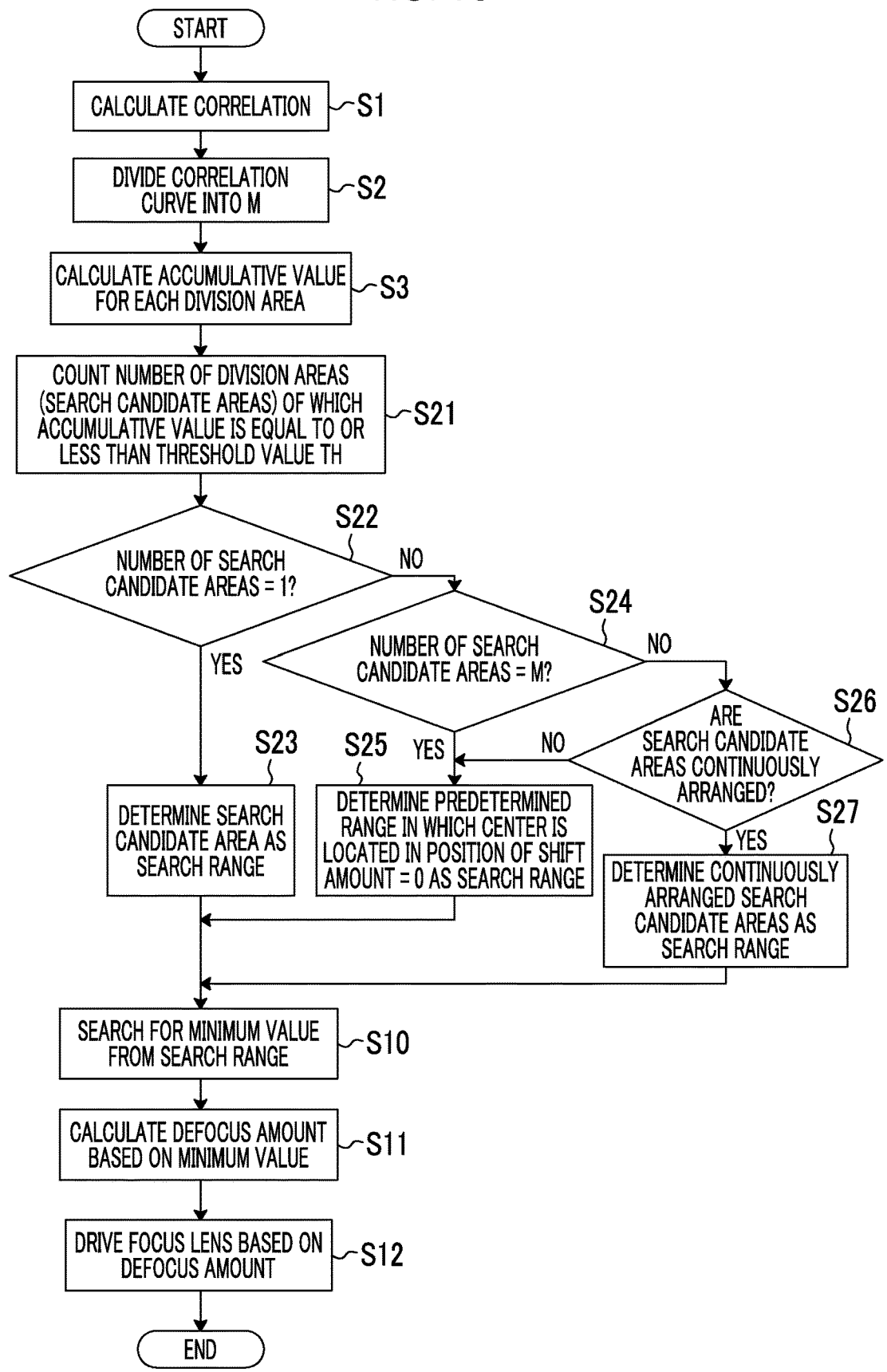
FIG. 13 is a flowchart showing a modification example of an operation of the digital camera shown in FIG. 1.

FIG. 13 is a flowchart illustrating a modification example of an operation of the digital camera shown in FIG. 1. In FIG. 13, the same processes as those of FIG. 10 will be assigned the same references, and the description thereof will be omitted.

The operation shown in FIG. 13 may be applied in a case where M is three or more. In FIG. 13, a case where M=8 will be described.

After step S3, the search range determining unit 11B sets the threshold value TH by using the aforementioned method, and counts the number of division areas (hereinafter, referred to as search candidate areas) of which the accumulative value is equal to or less than the threshold value TH (step S21).

In a case where the number of counted search candidate areas is 1 (step S22: YES), the search range determining unit 11B determines this search candidate area as the search range (step S23). After step S23, step S10 and the subsequent processes are performed.

In a case where the number of counted search candidate areas is two or more (step S22: NO), the search range determining unit 11B determines whether or not the number of counted search candidate areas is "M" (step S24).

In a case where the number of search candidate areas is "M" (step S24: YES), the search range determining unit 11B determines a predetermined range in which the center of the correlation curve is located in the position of shift amount=0, as the search range (step S25). After step S25, step S10 and the subsequent processes are performed.

Figure 14:
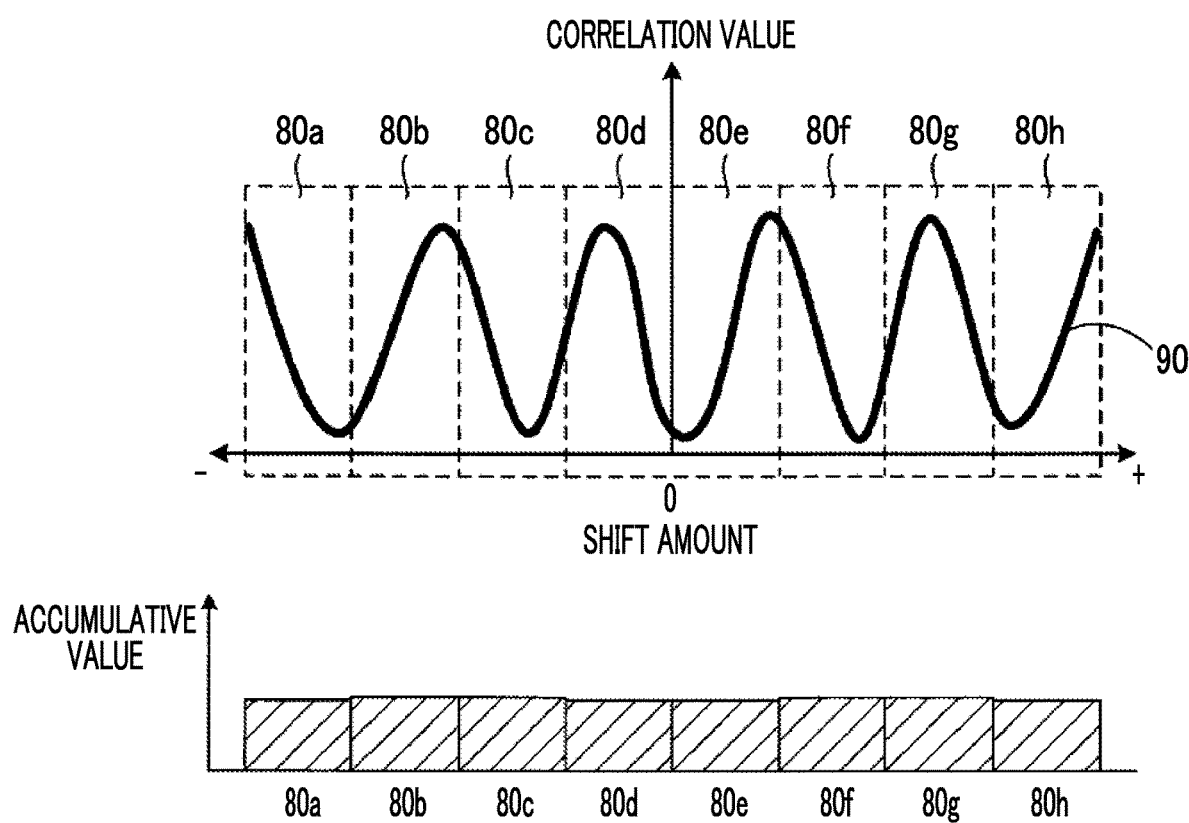
FIG. 14 is a graph showing an example of the correlation curve obtained through the correlation calculation.

FIG. 14 is a graph showing an example of the correlation curve obtained through the correlation calculation.

A correlation curve 90 shown in FIG. 14 has a shape in which the correlation values repeatedly increase and decrease. In a case where a subject captured by the selected AF area 53 is, for example, a repetitive pattern such as a streak pattern, the correlation curve shown in FIG. 14 is obtained.

The correlation curve 90 is divided into eight division areas (division areas 80a to 80h). In the lower row of FIG. 14, accumulative values of correlation values belonging to the division areas 80a to 80h in the correlation curve 90 are represented as bar graphs, and the bar graphs in which the accumulative values are equal to or less than the threshold value TH are hatched.

In the correlation curve in which the correlation values repeatedly increase and decrease like the correlation curve 90, a difference is hardly generated in the accumulative value for each division area, and all the division areas are the search candidate areas. In such a case, the entire correlation curve is not determined as the search range, and the predetermined range of which the center is located in the position of shift amount=0 is determined as the search range.

The predetermined range may be any range which is narrower than the width of the entire correlation curve in the lateral-axis direction. In a case where the predetermined range is too wide, since there is a possibility that the minimum value will not be determined, it is preferable that the predetermined range is a range in which the minimum value is able to be determined.

In the example of FIG. 14, a range which includes the division area 80d and the division area 80e is determined as the search range in step S25, for example. In a case where the division area is set over the position of shift amount=0, this division area is determined as the search range.

As stated above, the predetermined range in which the center is located in the position of shift amount=0 is determined as the search range, it is possible to reduce a change in the focus position even in a case where the minimum value determined within the search range is not a true minimum value. As a result, it is possible to restrain a captured image from being greatly blurred.

In a case where the number of search candidate areas is two or more and less than M as the determination result of step S24 (step S24: NO), the search range determining unit 11B determines the search range based on a positional relationship between the search candidate areas.

Specifically, the search range determining unit 11B determines whether or not the division areas of which the accumulative value exceeds the threshold value TH are present between all the search candidate areas, in other words, whether or not the continuously arranged search candidate areas are present among all the search candidate areas (step S26).

Figure 15:
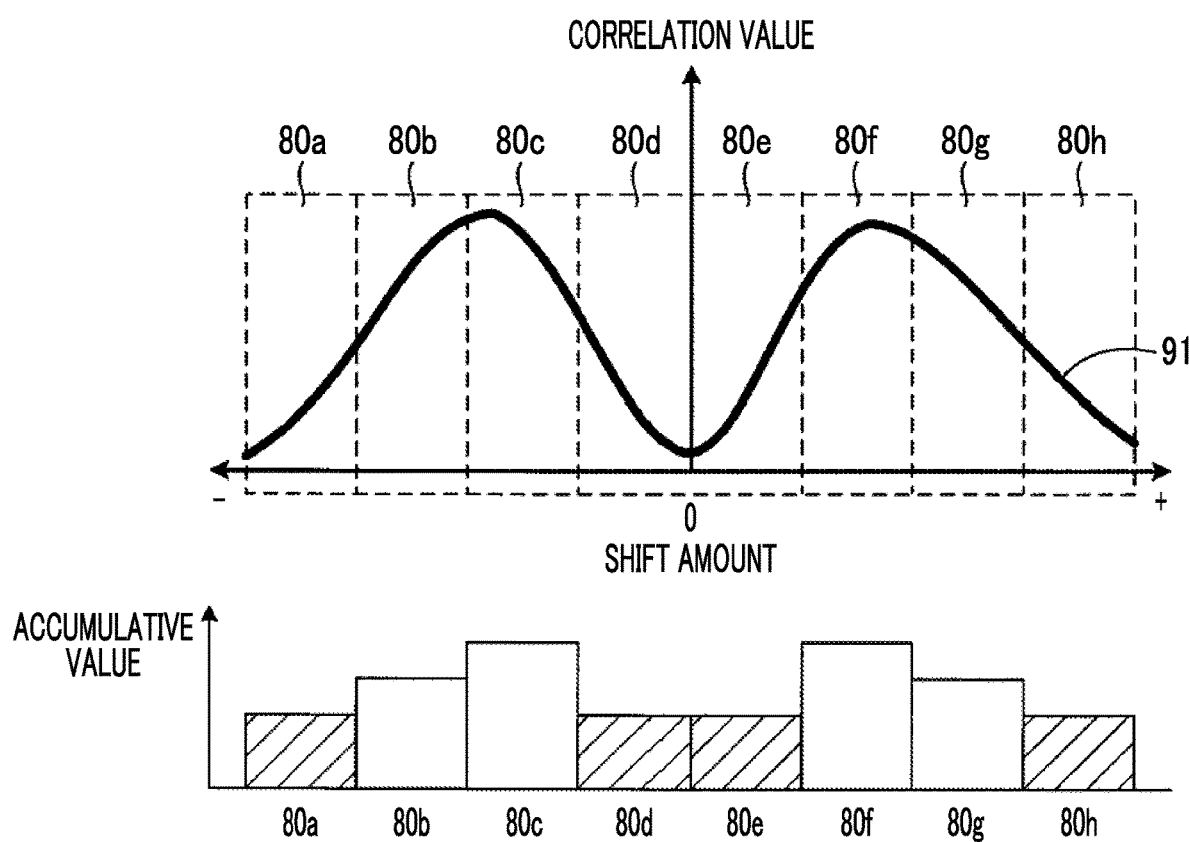
FIG. 15 is a graph showing an example of the correlation curve obtained through the correlation calculation.

FIG. 15 is a graph showing an example of the correlation curve obtained through the correlation calculation.

A correlation curve 91 shown in the upper row of FIG. 15 is divided into eight division areas (division areas 80a to 80h). In the lower row of FIG. 15, accumulative values of correlation values belonging to division areas 80a to 80h in the correlation curve 91 are represented as bar graphs, and the bar graphs in which the accumulative values are equal to or less than the threshold value TH are hatched.

Figure 16:
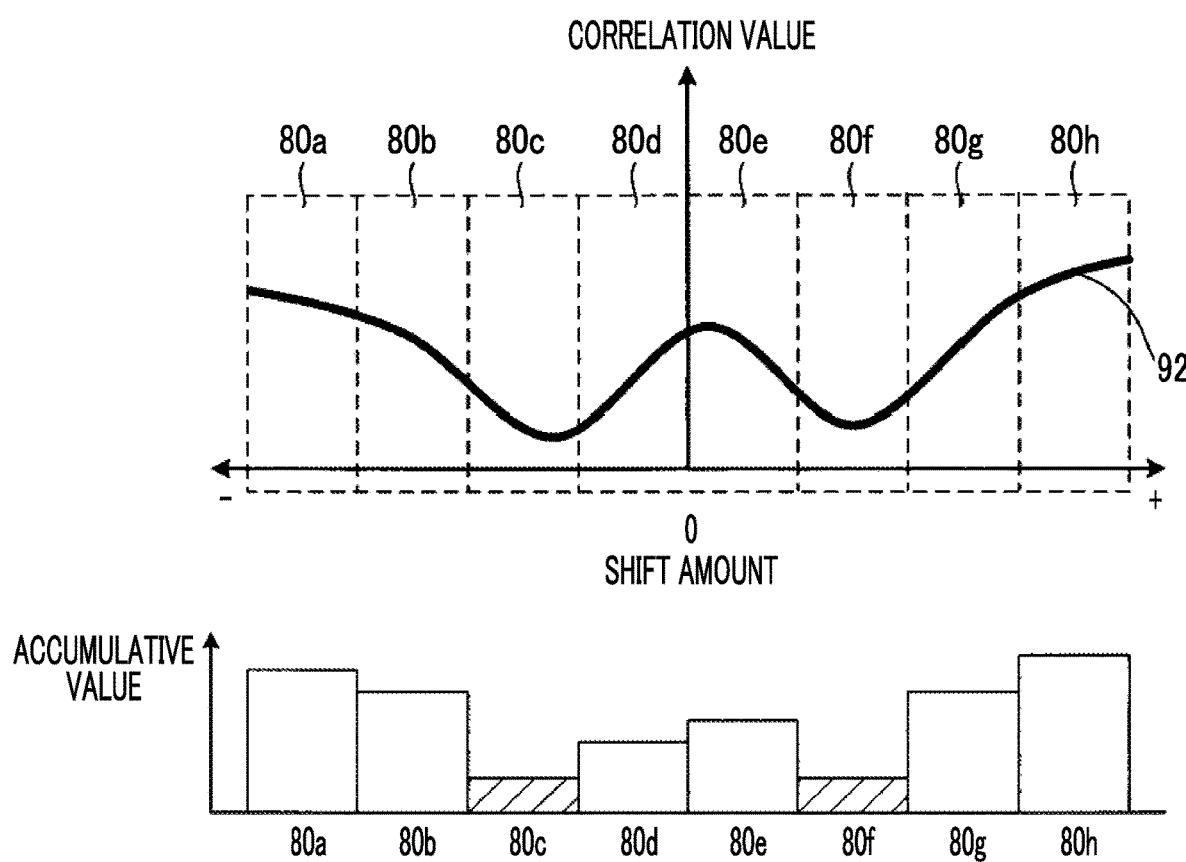
FIG. 16 is a graph showing an example of the correlation curve obtained through the correlation calculation.

FIG. 16 is a graph showing an example of the correlation curve obtained through the correlation calculation.

A correlation curve 92 shown in the upper row of FIG. 16 is divided into eight division areas (division areas 80a to 80h). In the lower row of FIG. 16, accumulative values of correlation values belonging to division areas 80a to 80h in the correlation curve 92 are represented as bar graphs, and the bar graphs in which the accumulative values are equal to or less than the threshold value TH are hatched.

In the example shown in FIG. 15, the search candidate areas are four areas which include the division area 80a, the division area 80d, the division area 80e, and the division area 80h.

Among the four search candidate areas, the division area of which the accumulative value exceeds the threshold value TH is not present between the division area 80d and the division area 80e, and the division area 80d and the division area 80e are continuously arranged. Thus, the determination result of step S26 of FIG. 13 is YES.

In the example shown in FIG. 16, the search candidate areas are two areas which include the division area 80c and the division area 80f. The division areas of which the accumulative value exceeds the threshold value TH are present between the two search candidate areas, and the two search candidate areas are not continuously arranged. Thus, the determination result of step S26 of FIG. 13 is NO.

In a case where the determination result of step S26 is YES, that is, in a case where the correlation curve 91 having the shape shown in FIG. 15 is obtained, there is a possibility that the minimum value will be present within the continuously arranged search candidate areas.

Thus, the search range determining unit 11B determines a range which includes the continuously arranged search candidate areas, as the search range (step S27). After step S27, step S10 and the subsequent processes are performed.

In a case where the determination result of step S26 is NO, that is, in a case where the correlation curve 92 having the shape shown in FIG. 16 is obtained, there is a possibility that the minimum value will be present both in the division area 80c and the division area 80f, and it is easy to change the determination result of the minimum value due to the influence of noise.

Thus, the search range determining unit 11B determines the search range by performing the process of step S25. After step S25, step S10 and the subsequent processes are performed. Step S3 and step S21 to step S27 of FIG. 13 constitute a search range determining step.

As stated above, according to the third modification example, in a case where the number of search candidate areas is 1, this search candidate area is determined as the search range. It is possible to narrow the search range, and thus, it is possible to improve determination precision of the minimum value. Accordingly, it is possible to improve the focusing precision. It is possible to narrow the search range, and thus, it is possible to reduce a processing load for searching for the minimum value. Accordingly, it is possible to perform AF at a high speed.

According to the third modification example, in a case where the number of search candidate areas is M, the predetermined range in which the center is located in the position of shift amount=0 is determined as the search range. Thus, it is possible to restrain the captured image from being greatly blurred while reducing a calculation amount required for determining the minimum value.

According to the third modification example, in a case where the number of search candidate areas is two or more and less than M and the search candidate areas are continuously arranged, the continuously arranged search candidate areas are determined as the search range. Thus, it is possible to narrow the search range, and it is possible to improve the determination precision of the minimum value. It is possible to perform AF at a high speed by reducing the calculation amount required for determining the minimum value.

According to the third modification example, in a case where the number of search candidate areas is two or more and less than M and the search candidate areas are not continuously arranged, the predetermined range is determined as the search range. Thus, it is possible to restrain the captured image from being greatly blurred while reducing a calculation amount required for determining the minimum value.

Although it has been described in the digital camera of FIG. 1 that the imaging element 5 for imaging the subject is also used as a sensor for AF, a dedicated sensor different from the imaging element 5 may be included in the digital camera.

Although the digital camera including the focusing control device is used as an example, the invention may be applied to a camera system for broadcasting.

Figure 17:
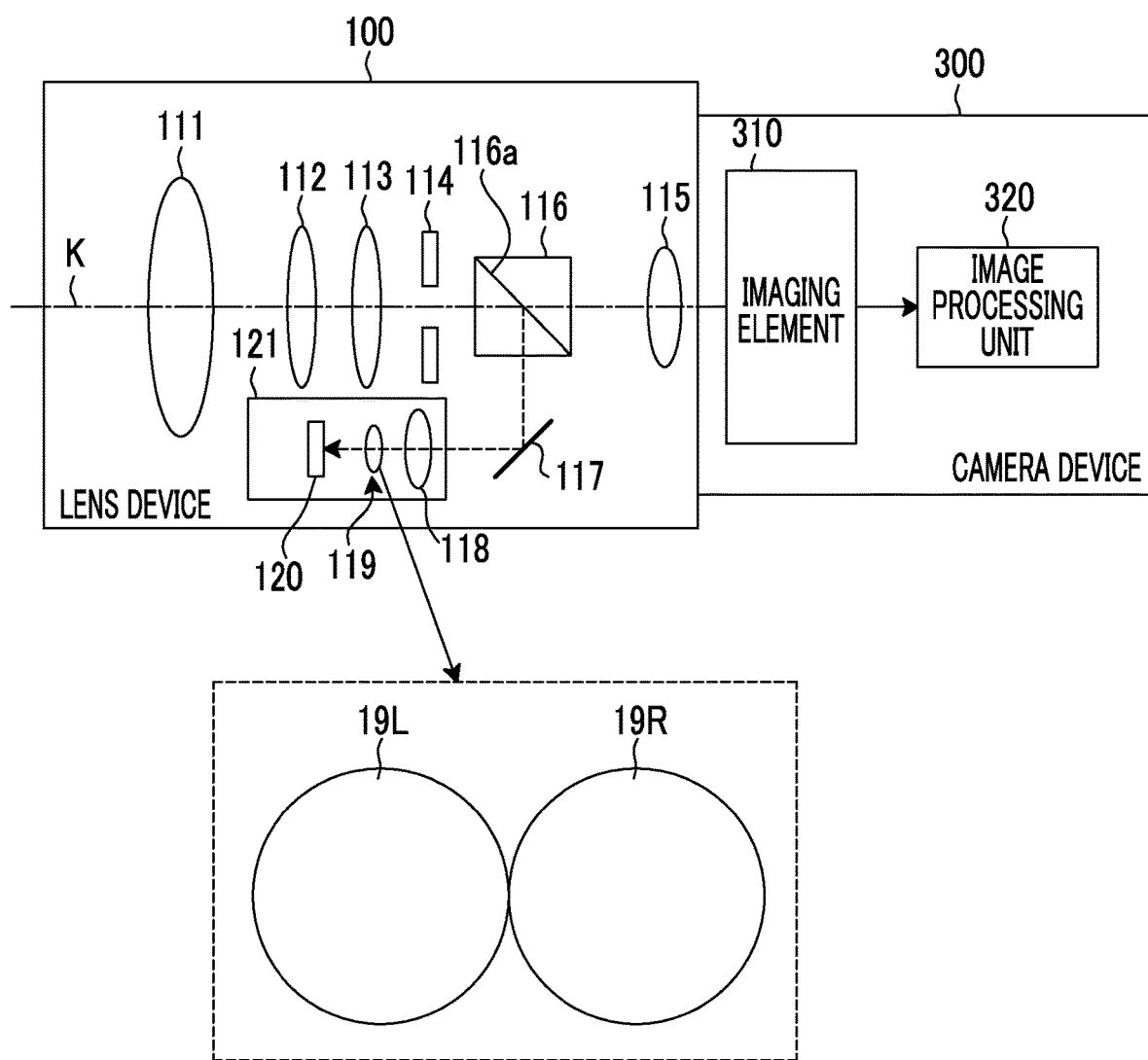
FIG. 17 is a diagram showing a schematic configuration of a camera system according to the embodiment of the invention.

FIG. 17 is a diagram showing a schematic configuration of a camera system according to the embodiment of the invention. The camera system is suitable for camera systems for business such as broadcasting or movie.

The camera system shown in FIG. 17 includes a lens device 100 and a camera device 300 as an imaging device to which the lens device 100 is attached.

The lens device 100 includes a focus lens 111, zoom lenses 112 and 113, a stop 114, and a master lens group 115, and these lenses are arranged in a line in order from the lens close to the subject.

The focus lens 111, the zoom lenses 112 and 113, the stop 114, and the master lens group 115 constitute the imaging optical system. The imaging optical system includes at least the focus lens 111.

The lens device 100 further includes a beam splitter 116 including a reflection surface 116a, a mirror 117, a condenser lens 118, a separator lens 119, and an AF unit 121 including an imaging element 120. The imaging element 120 is an image sensor such as a CMOS type image sensor or a CCD type image sensor including a plurality of pixels arranged in two dimensions.

The beam splitter 116 is disposed between the stop 114 and the master lens group 115 on an optical axis K. The beam splitter 116 transmits some (for example, 80% of the subject light rays) of subject light rays which are incident on the imaging optical system and pass through the stop 114, and reflects the remaining light rays (for example, 20% of the subject light rays) acquired by subtracting the some of the subject light rays from the reflection surface 116a in a direction perpendicular to the optical axis K.

The position of the beam splitter 116 is not limited to the position shown in FIG. 17, and the beam splitter may be positioned behind the lens of the imaging optical system closest to the subject on the optical axis K.

The mirror 117 is disposed on an optical path of the light rays reflected from the reflection surface 116a of the beam splitter 116. Thus, the light rays are reflected, and are incident on the condenser lens 118 of the AF unit 121.

The condenser lens 118 concentrates the light rays reflected from the mirror 117.

As shown as an enlarged front view surrounded by a dashed line in FIG. 17, the separator lens 119 is composed of two lenses 19R and 19L arranged in a line in a direction (a horizontal direction in the example of FIG. 17) with an optical axis of the imaging optical system interposed therebetween.

The subject light rays concentrated by the condenser lens 118 pass through the two lenses 19R and 19L, and form images in different positions on a light reception surface (a surface on which a plurality of pixels is formed) of the imaging element 120. That is, a pair of subject light images shifted in one direction is formed on the light reception surface of the imaging element 120.

The beam splitter 116, the mirror 117, the condenser lens 118, and the separator lens 119 function as an optical element that causes some of the subject light rays incident on the imaging optical system to be incident on an imaging element 310 of the camera device 300 that images the subject light images through the imaging optical system and causes the remaining subject light rays acquired by removing the some of the subject light rays to be incident on the imaging element 120.

The mirror 117 may be removed, and the light rays reflected by the beam splitter 116 may be directly incident on the condenser lens 118.

The imaging element 120 is an area sensor in which a plurality of pixels is arranged on a light reception surface in two dimensions, and outputs image signals corresponding to the two subject light images formed on the light reception surface. That is, the imaging element 120 outputs a pair of image signals shift in a horizontal direction from one subject light image formed by the imaging optical system.

It is possible to avoid a difficulty in precisely adjusting a position between line sensors by using the area sensor as the imaging element 120 compared to a case where the line sensors are used.

Among the pixels included in the imaging element 120, the pixel that outputs one of the pair of image signals shifted in the horizontal direction constitutes the first signal detection section that receives one luminous flux of the pair of luminous fluxes passing through two different portions arranged in the horizontal direction of the pupil region of the imaging optical system and detects the signal corresponding to the light reception amount.

Among the pixels included in the imaging element 120, the pixel that outputs the other one of the pair of image signals shifted in the horizontal direction constitutes a second signal detection section that receives the other luminous flux of the pair of luminous fluxes passing through the two different portions arranged in the horizontal direction of the pupil region of the imaging optical system and detects the signal corresponding to the light reception amount.

Although the area sensor is used as the imaging element 120, a line sensor in which the plurality of pixels constituting the first signal detection section is arranged in the horizontal direction may be disposed in a position facing the lens 19R and a line sensor in which the plurality of pixels constituting the second signal detection section is arranged in the horizontal direction may be disposed in a position facing the lens 19R, instead of the imaging element 120.

The camera device 300 includes the imaging element 310 such as a CCD type image sensor or a CMOS type image sensor disposed on the optical axis K of the lens device 100, and an image processing unit 320 that generates captured image data by processing image signals acquired by imaging the subject light images by the imaging element 310.

The block configuration of the lens device 100 is the same as the lens device of FIG. 1, and includes a drive unit that drives the focus lens and a system controller that controls the drive unit. The system controller functions as the aforementioned functional blocks by executing the focusing control program.

However, the first signal group and the second signal group input to the system controller are signals output from the first signal detection section and the second signal detection section of the imaging element 120. In the camera system, the system controller of the lens device 100 functions as the focusing control device.

Although it has been described above that the digital camera is used as the imaging device, an embodiment of a smartphone with a camera as the imaging device will be described below.

Figure 18:
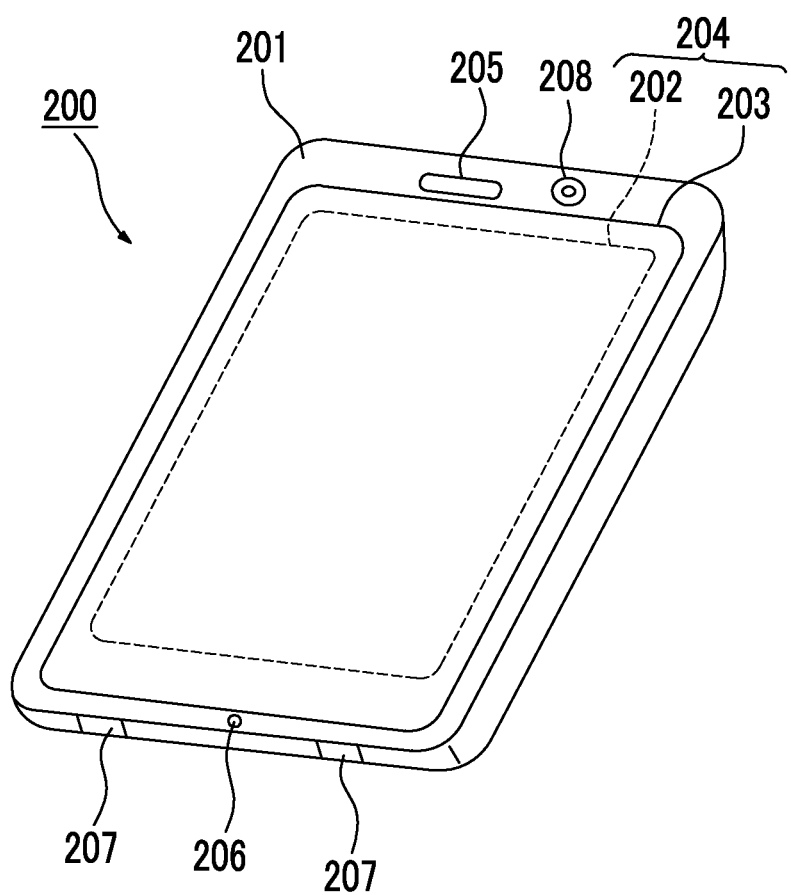
FIG. 18 shows the appearance of a smartphone 200 which is an embodiment of an imaging device of the invention.

FIG. 18 shows the appearance of a smartphone 200 which is an embodiment of an imaging device of the invention.

The smartphone 200 shown in FIG. 18 has a flat plate-shaped housing 201, and includes a display input unit 204 in which a display panel 202 as a display unit on one surface of the housing 201 and an operation panel 203 as an input unit are integrated.

The housing 201 includes a speaker 205, a microphone 206, an operating unit 207, and a camera unit 208.

The configuration of the housing 201 is not limited thereto, and for example, a configuration in which the display unit and the input unit are independent from each other may be employed, or a configuration having a folding structure or a slide mechanism may be employed.

Figure 19:
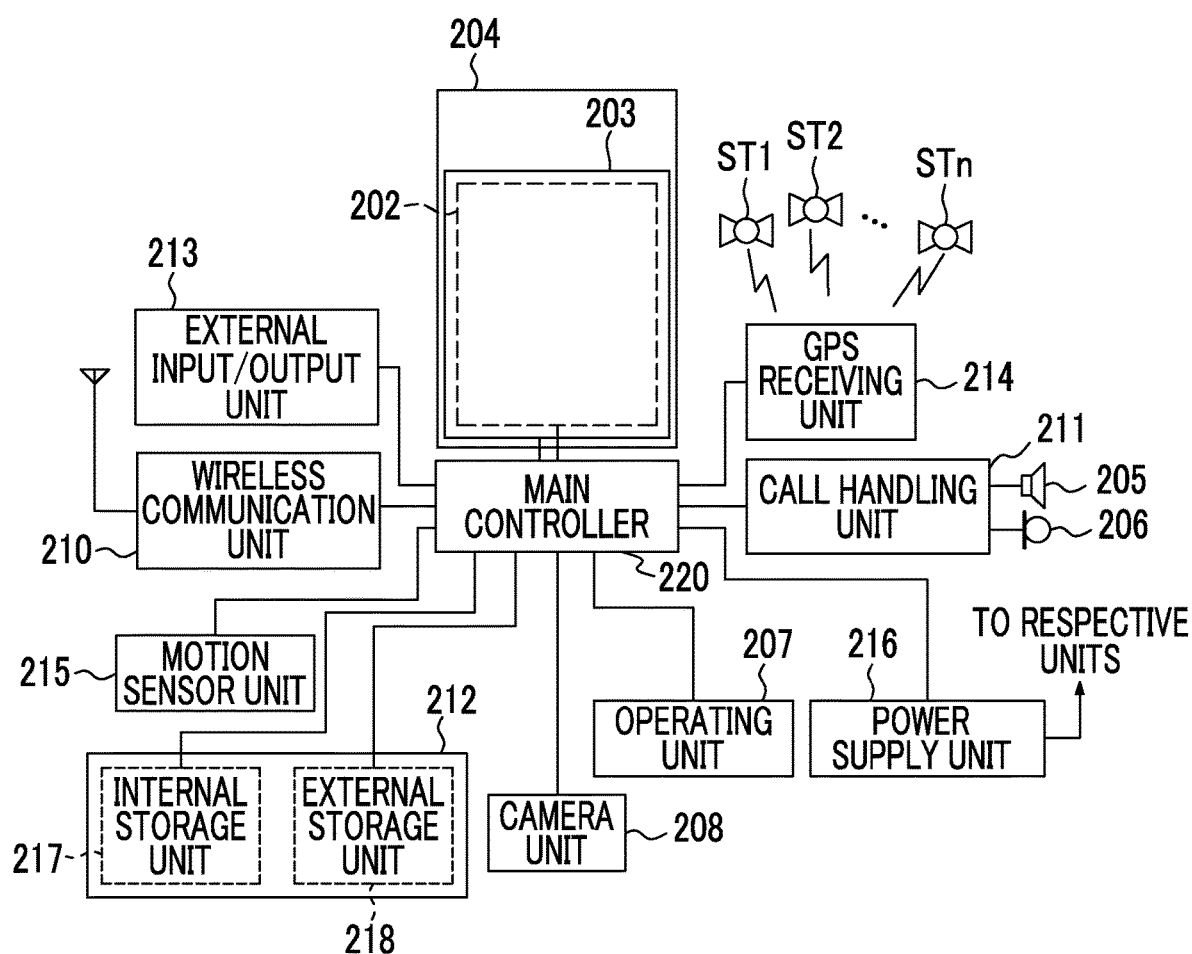
FIG. 19 is a block diagram showing the configuration of the smartphone 200 shown in FIG. 18.

FIG. 19 is a block diagram showing the configuration of the smartphone 200 shown in FIG. 18.

As shown in FIG. 19, principal components of the smartphone include a wireless communication unit 210, a display input unit 204, a call handling unit 211, an operating unit 207, a camera unit 208, a storage unit 212, an external input/output unit 213, a global positioning system (GPS) receiving unit 214, a motion sensor unit 215, a power supply unit 216, and a main controller 220.

Principal functions of the smartphone 200 include a wireless communication function of performing mobile wireless communication through a base station device BS (not shown) through a mobile communication network NW (not shown).

The wireless communication unit 210 performs wireless communication with a base station device BS in the mobile communication network NW according to a command of the main controller 220. With the use of the wireless communication, transmission and reception of various kinds of file data, such as voice data and image data, and electronic mail data, or reception of Web data, streaming data, or the like are performed.

The display input unit 204 is a so-called touch panel which displays images (still images and moving images) or character information, or the like to visually transfer information to the user and detects a user's operation on the displayed information under the control of the main controller 220, and includes the display panel 202 and the operation panel 203.

The display panel 202 uses a liquid crystal display (LCD), an organic electro-luminescence display (OELD), or the like as a display device.

The operation panel 203 is a device which is placed such that an image displayed on a display surface of the display panel 202 is visible, and detects one or a plurality of coordinates of an operation with a user's finger or a stylus. If the device is operated with the user's finger or the stylus, a detection signal due to the operation is output to the main controller 220. Next, the main controller 220 detects an operation position (coordinates) on the display panel 202 based on the received detection signal.

As shown in FIG. 18, although the display panel 202 and the operation panel 203 of the smartphone 200 illustrated as an embodiment of an imaging device of the invention are integrated to constitute the display input unit 204, the operation panel 203 is arranged to completely cover the display panel 202.

In a case where this arrangement is employed, the operation panel 203 may include a function of detecting a user's operation even in a region outside the display panel 202. In other words, the operation panel 203 may include a detection region (hereinafter, referred to as a display region) for a superimposed portion overlapping the display panel 202 and a detection region (hereinafter, referred to as a non-display region) for an outer edge portion not overlapping the display panel 202 other than the display region.

Although the size of the display region may completely match the size of the display panel 202, it is not necessary to match both sizes of the display region and the size of the display panel. The operation panel 203 may include two sensitive regions including an outer edge portion and an inner portion other than the outer edge portion. The width of the outer edge portion is appropriately designed according to the size of the housing 201 or the like.

As a position detection system which is employed in the operation panel 203, a matrix switching system, a resistive film system, a surface acoustic wave system, an infrared system, an electromagnetic induction system, an electrostatic capacitance system, and the like are exemplified, and any system thereof can be employed.

The call handling unit 211 includes the speaker 205 and the microphone 206, converts voice of the user input through the microphone 206 to voice data processable in the main controller 220 and outputs voice data to the main controller 220, or decodes voice data received by the wireless communication unit 210 or the external input/output unit 213 and outputs voice from the speaker 205.

As shown in FIG. 17, for example, the speaker 205 can be mounted on the same surface as the surface on which the display input unit 204 is provided, and the microphone 206 can be mounted on the side surface of the housing 201.

The operating unit 207 is a hardware key using a key switch or the like, and receives a command from the user. For example, as shown in FIG. 18, the operating unit 207 is a push button-type switch which is mounted on the side surface of the housing 201 of the smartphone 200, and is turned on by being depressed with a finger or the like and is turned off by restoration force of a spring or the like in a case where the finger is released.

The storage unit 212 stores a control program or control data of the main controller 220, application software, address data in association with the name, telephone number, and the like of a communication partner, data of transmitted and received electronic mail, Web data downloaded by Web browsing, and downloaded content data, and temporarily stores streaming data or the like. The storage unit 212 is constituted of an internal storage unit 217 embedded in the smartphone and an external storage unit 218 having a slot for an attachable and detachable external memory.

The internal storage unit 217 and the external storage unit 218 constituting the storage unit 212 are realized using a memory (for example, a microSD (Registered Trademark) memory or the like), such as a flash memory type, a hard disk type, a multimedia card micro type, or a card type, or a storage medium, such as a random access memory (RAM) or a read only memory (ROM).

The external input/output unit 213 plays a role of an interface with all external devices connected to the smartphone 200, and is provided for direct or indirect connection to other external devices through communication or the like (for example, universal serial bus (USB), IEEE 1394, or the like), or a network (for example, the Internet, wireless LAN, Bluetooth (Registered trademark), radio frequency identification (RFID), infrared communication (infrared data association: IrDA (Registered Trademark), ultra wideband (UWB) (Registered Trademark), ZigBee (Registered Trademark), or the like).

The external devices connected to the smartphone 200 are, for example, a wired or wireless headset, a wired or wireless external charger, a wired or wireless data port, a memory card connected through a card socket, a subscriber identity module (SIM) card, a user identity module (UIM) card, an external audio-video device connected through an audio-video input/output (I/O) terminal, an external audio-video device connected in a wireless manner, a smartphone connected in a wired or wireless manner, a personal computer connected in a wired or wireless manner, a PDA connected in a wired or wireless manner, an earphone connected in a wired or wireless manner, and the like.

The external input/output unit 213 transfers data transmitted from the external devices to the respective components in the smartphone 200 or transmits data in the smartphone 200 to the external devices.

The GPS receiving unit 214 receives GPS signals transmitted from GPS satellites ST1 to STn according to a command of the main controller 220, executes positioning calculation processing based on a plurality of received GPS signals, and detects the position of the smartphone 200 having latitude, longitude, and altitude.

In a case where positional information can be acquired from the wireless communication unit 210 or the external input/output unit 213 (for example, a wireless LAN), the GPS receiving unit 214 can detect the position using the positional information.

The motion sensor unit 215 includes, for example, a three-axis acceleration sensor or the like, and detects physical motion of the smartphone 200 according to a command of the main controller 220. The moving direction or acceleration of the smartphone 200 is detected by detecting physical motion of the smartphone 200. The detection result is output to the main controller 220.

The power supply unit 216 supplies electric power stored in a battery (not shown) to the respective units of the smartphone 200 according to a command of the main controller 220.

The main controller 220 includes a microprocessor, operates according to the control program or control data stored in the storage unit 212, and integrally controls the respective units of the smartphone 200.

The main controller 220 has a mobile communication control function of controlling respective units of a communication system in order to perform voice communication or data communication through the wireless communication unit 210, and an application processing function.

The application processing function is realized by the main controller 220 operating according to application software stored in the storage unit 212.

The application processing function is, for example, an infrared communication function of controlling the external input/output unit 213 to perform data communication with a device facing the smartphone 200, an electronic mail function of transmitting and receiving electronic mail, a Web browsing function of browsing Web pages, or the like.

The main controller 220 has an image processing function of displaying video on the display input unit 204, or the like based on image data (still image or moving image data), such as received data or downloaded streaming data.

The image processing function refers to a function of the main controller 220 decoding image data, performing image processing on the decoding result, and displaying an image on the display input unit 204.

The main controller 220 executes display control on the display panel 202 and operation detection control for detecting a user's operation through the operating unit 207 and the operation panel 203. With the execution of the display control, the main controller 220 displays an icon for activating application software or a software key, such as a scroll bar, or displays a window for creating electronic mail.

The scroll bar refers to a software key for receiving a command to move a display portion of an image which is too large to fit into the display region of the display panel 202.

With the execution of the operation detection control, the main controller 220 detects a user's operation through the operating unit 207, receives an operation on the icon or an input of a character string in an entry column of the window through the operation panel 203, or receives a scroll request of a display image through the scroll bar.

In addition, with the execution of the operation detection control, the main controller 220 has a touch panel control function of determining whether an operation position on the operation panel 203 is the superimposed portion (display region) overlapping the display panel 202 or the outer edge portion (non-display region) not overlapping the display panel 202 other than the display region, and controlling the sensitive region of the operation panel 203 or the display position of the software key.

The main controller 220 may detect a gesture operation on the operation panel 203 and may execute a function set in advance according to the detected gesture operation. The gesture operation is not a conventional simple touch operation, but means an operation to render a track with a finger or the like, an operation to simultaneously designate a plurality of positions, or an operation to render a track for at least one of a plurality of positions by combining the above-described operations.

The camera unit 208 includes the configuration other than the external memory controller 20, the recording medium 21, the display controller 22, the display unit 23, and the operating unit 14 in the digital camera shown in FIG. 1.

Captured image data generated by the camera unit 208 can be recorded in the storage unit 212 or can be output through the external input/output unit 213 or the wireless communication unit 210.

In the smartphone 200 shown in FIG. 18, although the camera unit 208 is mounted on the same surface as the display input unit 204, the mounting position of the camera unit 208 is not limited thereto, and the camera unit 208 may be mounted on the rear surface of the display input unit 204.

The camera unit 208 can be used for various functions of the smartphone 200. For example, the image obtained by the camera unit 208 may be displayed on the display panel 202. The image of the camera unit 208 may be used as one of operation inputs of the operation panel 203.

In a case where the GPS receiving unit 214 detects the position, the position may be detected with reference to an image from the camera unit 208. In addition, the optical axis direction of the camera unit 208 of the smartphone 200 may be determined or a current use environment may be determined with reference to an image from the camera unit 208 without using the three-axis acceleration sensor or in combination with the three-axis acceleration sensor. Of course, an image from the camera unit 208 may be used in application software.

In addition, image data of a still image or a moving image may be attached with positional information acquired by the GPS receiving unit 214, voice information (which may be converted to text information through voice-text conversion by the main controller or the like) acquired by the microphone 206, posture information acquired by the motion sensor unit 215, or the like and can be recorded in the storage unit 212, or may be output through the external input/output unit 213 or the wireless communication unit 210.

As stated above, the following matters are disclosed in this specification.

(1) A focusing control device comprises a sensor that has a focus detection area in which a plurality of first signal detection sections which receives one of a pair of luminous fluxes passing through different portions arranged in one direction of a pupil region of an imaging optical system including a focus lens and detects signals corresponding to light reception amounts and a plurality of second signal detection sections which receives the other one of the pair of luminous fluxes and detects signals corresponding to light reception amounts are formed, a correlation calculating unit that obtains correlation values between a first signal group output from the plurality of first signal detection sections and a second signal group output from the plurality of second signal detection sections for different shift amounts while shifting the first signal group and the second signal group in the one direction by arbitrary amounts, a search range determining unit that obtains an accumulative value of the correlation values included in each of a plurality of division areas obtained by dividing a graph of the correlation values in which the shift amounts are represented on a first axis in a direction of the first axis for each division area, and determines a search range of the graph which is a searching target of a minimum value of the correlation values based on the accumulative value, and a focusing controller that performs focusing control by controlling the focus lens based on the shift amount corresponding to the correlation value which is the minimum value in the search range.

(2) In the focusing control device according (1), the search range determining unit determines the division area of which the accumulative value is equal to or less than a threshold value, as the search range.

(3) In the focusing control device according to (1), the search range determining unit obtains an accumulative value of correlation values included in each of division candidate areas obtained by dividing a candidate area of the search range in the direction of the first axis for each division candidate area, the candidate area being the division area of which the accumulative value is equal to or less than a threshold value, and determines the search range in the candidate area based on the accumulative value.

(4) In the focusing control device according to (1), the plurality of division areas is three or more division areas, and in a case where the number of division areas of which the accumulative value is equal to or less than a threshold value is two or more and is less than a total number of division areas, the search range determining unit determines the search range based on a positional relationship between the two or more division areas.

(5) In the focusing control device according to (4), in a case where a division area of which the accumulative value exceeds the threshold value is present between the two or more division areas, the search range determining unit determines a predetermined range in which a center is located at a position where the shift amount is zero, as the search range.

(6) In the focusing control device according to (4) or (5), in a case where a plurality of continuously arranged division areas is present among the two or more division areas, the search range determining unit determines the plurality of division areas as the search range.

(7) In the focusing control device according to any one of (4) to (6), in a case where the number of division areas of which the accumulative value is equal to or less than the threshold value is equal to a total number of division areas, the search range determining unit determines a predetermined range in which a center is located at a position where the shift amount is zero, as the search range.

(8) In the focusing control device according to (1), the plurality of division areas is three or more division areas, and in a case where the number of division areas of which the accumulative value is equal to or less than a threshold value is equal to a total number of division areas, the search range determining unit determines a predetermined range in which a center is located at a position where the shift amount is zero, as the search range.

(9) In the focusing control device according to (1), the search range determining unit determines the search range by comparing the accumulative values of the division areas with each other.

(10) A lens device comprises the focusing control device according to any one of (1) to (9), and an imaging optical system including the focus lens for causing light to be incident on the sensor.

(11) An imaging device comprises the focusing control device according to any one of (1) to (9).

(12) A focusing control method comprises a correlation calculating step of obtaining correlation values between a first signal group output from a plurality of first signal detection sections, which receives one of a pair of luminous fluxes passing through different portions arranged in one direction of a pupil region of an imaging optical system including a focus lens and detects signals corresponding to light reception amounts, and a second signal group output from a plurality of second signal detection sections, which receives the other one of the pair of luminous fluxes and detects signals corresponding to light reception amounts, for different shift amounts while shifting the first signal group and the second signal group in one direction by arbitrary amounts, the plurality of first signal detection sections and the plurality of second signal detection sections being formed in a focus detection area of a sensor, a search range determining step of obtaining an accumulative value of the correlation values included in each of a plurality of division areas obtained by dividing a graph of the correlation values in which the shift amounts are represented on a first axis in a direction of the first axis for each division area and determining a search range of the graph which is a searching target of a minimum value of the correlation values based on the accumulative value, and a focusing controlling step of performing focusing control by controlling the focus lens based on the shift amount corresponding to the correlation value which is the minimum value in the search range.

(13) In the focusing control method according to (12), in the search range determining step, the division area of which the accumulative value is equal to or less than a threshold value is determined as the search range.

(14) In the focusing control method according to (12), in the search range determining step, an accumulative value of correlation values included in each of division candidate areas obtained by dividing a candidate area of the search range in the direction of the first axis for each division candidate area, the candidate area being the division area of which the accumulative value is equal to or less than a threshold value, and the search range is determined in the candidate area based on the accumulative value.

(15) In the focusing control method according to (12), the plurality of division areas is three or more division areas, and in a case where the number of division areas of which the accumulative value is equal to or less than a threshold value is two or more and is less than a total number of division areas, the search range is determined based on a positional relationship between the two or more division areas in the search range determining step.

(16) In the focusing control method according to (15), in a case where a division area of which the accumulative value exceeds the threshold value is present between the two or more division areas, a predetermined range in which a center is located at a position where the shift amount is zero is determined as the search range in the search range determining step.

(17) In the focusing control method according to (15) or (16), in a case where a plurality of continuously arranged division areas is present among the two or more division areas, the plurality of division areas is determined as the search range in the search range determining step.

(18) In the focusing control method according to any one of (15) to (17), in a case where the number of division areas of which the accumulative value is equal to or less than the threshold value is equal to a total number of division areas, a predetermined range in which a center is located at a position where the shift amount is zero is determined as the search range in the search range determining step.

(19) In the focusing control method according to (12), the plurality of division areas is three or more division areas, and in a case where the number of division areas of which the accumulative value is equal to or less than a threshold value is equal to a total number of division areas, a predetermined range in which a center is located at a position where the shift amount is zero is determined as the search range in the search range determining step.

(20) In the focusing control method according to (12), in the search range determining step, the search range is determined by comparing the accumulative values of the division areas with each other.

(21) A focusing control program causes a computer to perform a correlation calculating step of obtaining correlation values between a first signal group output from a plurality of first signal detection sections, which receives one of a pair of luminous fluxes passing through different portions arranged in one direction of a pupil region of an imaging optical system including a focus lens and detects signals corresponding to light reception amounts, and a second signal group output from a plurality of second signal detection sections, which receives the other one of the pair of luminous fluxes and detects signals corresponding to light reception amounts, for different shift amounts while shifting the first signal group and the second signal group in one direction by arbitrary amounts, the plurality of first signal detection sections and the plurality of second signal detection sections being formed in a focus detection area of a sensor, a search range determining step of obtaining an accumulative value of the correlation values included in each of a plurality of division areas obtained by dividing a graph of the correlation values in which the shift amounts are represented on a first axis in a direction of the first axis for each division area and determining a search range of the graph which is a searching target of a minimum value of the correlation values based on the accumulative value, and a focusing controlling step of performing focusing control by controlling the focus lens based on the shift amount corresponding to the correlation value which is the minimum value in the search range.

(22) A focusing control device comprises a sensor that has a focus detection area in which a plurality of first signal detection sections which receives one of a pair of luminous fluxes passing through different portions arranged in one direction of a pupil region of an imaging optical system including a focus lens and detects signals corresponding to light reception amounts and a plurality of second signal detection sections which receives the other one of the pair of luminous fluxes and detects signals corresponding to light reception amounts are formed, and a processor that obtains correlation values between a first signal group output from the plurality of first signal detection sections and a second signal group output from the plurality of second signal detection sections for different shift amounts while shifting the first signal group and the second signal group in the one direction by arbitrary amounts, obtains an accumulative value of the correlation values included in each of a plurality of division areas obtained by dividing a graph of the correlation values in which the shift amounts are represented on a first axis in a direction of the first axis for each division area, determines a search range of the graph which is a searching target of a minimum value of the correlation values based on the accumulative value, and performs focusing control by controlling the focus lens based on the shift amount corresponding to the correlation value which is the minimum value in the search range.

According to the invention, it is possible to provide a focusing control device, a focusing control method, a focusing control program, a lens device, and an imaging device capable of improving focusing accuracy through a phase difference AF method.

Although the invention has been described above by a specific embodiment, the invention is not limited to the embodiment, and various modifications may be made without departing from the technical spirit of the invention disclosed herein.

This application is based on Japanese Patent Application (2016-134314), filed Jul. 6, 2016, the content of which is incorporated herein.

EXPLANATION OF REFERENCES

1: imaging lens
2: stop
4: lens controller
5: imaging element
6: analog signal processing unit
7: analog-to-digital conversion circuit
8: lens drive unit
9: stop drive unit
10: imaging element drive unit
11: system controller
11A: correlation calculating unit
11B: search range determining unit
11C: defocus amount calculating unit
11D: focusing controller
14: operating unit
15: memory controller
16: main memory
17: digital signal processing unit
20: external memory controller
21: recording medium
22: display controller
23: display unit
24: control bus
25: data bus
40: lens device
50: light reception surface
51: pixel 52, 52A, 52B: phase difference detection pixel
53: AF area
c: opening
PD: photoelectric conversion section
X: row direction
Y: column direction
80, 90, 91, 92: correlation curve
80A, 80B, 80*a* to 80*h*: division area
80C, 80D, 80E, 80F: division candidate area
100: lens device
111: focus lens
112, 113: zoom lens
114: stop
115: master lens group
116: beam splitter
116*a*: reflection surface
117: mirror
118: condenser lens
119: separator lens
19L, 19R: lens
120: imaging element
121: unit
300: camera device
310: imaging element
320: image processing unit
K: optical axis
200: smartphone
201: housing
202: display panel
203: operation panel
204: display input unit
205: speaker
206: microphone
207: operating unit
208: camera unit
210: wireless communication unit
211: call handling unit
212: storage unit
213: external input/output unit
214: GPS receiving unit
215: motion sensor unit
216: power supply unit
217: internal storage unit
218: external storage unit
220: main controller
ST1 to STn: GPS satellite

What is claimed is:

1. A focusing control device comprising:
a sensor, comprising a plurality of first signal detection sections which receives one of a pair of luminous fluxes passing through different portions arranged in one direction of a pupil region of an imaging optical system including a focus lens and detects signals and a plurality of second signal detection sections which receives other one of the pair of luminous fluxes and detects signals are formed; and
a processor, configured to:
obtain correlation values between a first signal group output from the plurality of first signal detection sections and a second signal group output from the plurality of second signal detection sections for different shift amounts while shifting the first signal group and the second signal group in the one direction by arbitrary amounts;
obtain an accumulative value of the correlation values included in each of a plurality of division areas obtained by dividing a graph of the correlation values in which the shift amounts are represented on a first axis in a direction of the first axis, wherein the plurality of division areas represents the entire graph of the correlation values, wherein the graph of the correlation values includes the entire range of the obtained correlation values; and
perform focusing control by controlling the focus lens based on the accumulative value obtained.

2. The focusing control device according to claim 1, wherein the processor
determines a search range of the graph which is a searching target of a minimum value of the correlation values based on the accumulative value; and
controls the focus lens based on the shift amount corresponding to the correlation value which is the minimum value in the search range.

3. The focusing control device according to claim 2, wherein the processor determines the division area of which the accumulative value is equal to or less than a threshold value, as the search range.

4. The focusing control device according to claim 2, wherein the processor obtains the accumulative value of the correlation values included in each of a plurality of division candidate areas obtained by dividing a candidate area of the search range in the direction of the first axis for each of the plurality of division candidate areas, the candidate area being the division area of which the accumulative value is equal to or less than a threshold value, and determines the search range in the candidate area based on the accumulative value.

5. The focusing control device according to claim 2, wherein the plurality of division areas is three or more division areas, and
in a case where number of the division areas, of which the accumulative value is equal to or less than a threshold value, is two or more and is less than a total number of the division areas, the processor determines the search range based on a positional relationship between the two or more division areas.

6. The focusing control device according to claim 5, wherein, in a case where a division area, of which the accumulative value exceeds the threshold value, is present between the two or more division areas, the processor determines a predetermined range in which a center is located at a position where the shift amount is zero, as the search range.

7. The focusing control device according to claim 5, wherein, in a case where a plurality of continuously arranged division areas is present among the two or more division areas, the processor determines the plurality of division areas as the search range.

8. The focusing control device according to claim 5, wherein, in a case where the number of the division areas, of which the accumulative value is equal to or less than the threshold value, is equal to a total number of the division areas, the processor determines a predetermined range in which a center is located at a position where the shift amount is zero, as the search range.

9. The focusing control device according to claim 2, wherein the plurality of division areas is three or more division areas, and
in a case where number of the division areas, of which the accumulative value is equal to or less than a threshold value, is equal to a total number of the division areas, the processor determines a predetermined range in which a center is located at a position where the shift amount is zero, as the search range.

10. The focusing control device according to claim 2, wherein the processor determines the search range by comparing the accumulative values of the division areas with each other.

11. A lens device comprising:
the focusing control device according to claim 1; and
an imaging optical system including the focus lens for causing light to be incident on the sensor.

12. An imaging device comprising:
the focusing control device according to claim 1.

13. A focusing control method comprising:
obtaining correlation values between a first signal group output from a plurality of first signal detection sections, which receives one of a pair of luminous fluxes passing through different portions arranged in one direction of a pupil region of an imaging optical system including a focus lens and detects signals, and a second signal group output from a plurality of second signal detection sections, which receives other one of the pair of luminous fluxes and detects signals, for different shift amounts while shifting the first signal group and the second signal group in one direction by arbitrary amounts, the plurality of first signal detection sections and the plurality of second signal detection sections being formed in a focus detection area of a sensor;
obtaining an accumulative value of the correlation values included in each of a plurality of division areas obtained by dividing a graph of the correlation values in which the shift amounts are represented on a first axis in a direction of the first axis, wherein the plurality of division areas represents the entire graph of the correlation values, wherein the graph of the correlation values includes the entire range of the obtained correlation values; and
performing focusing control by controlling the focus lens based on the accumulative value obtained.

14. The focusing control method according to claim 13, wherein
the step of controlling the focus lens based on the accumulative value obtained further comprising
determining a search range of the graph which is a searching target of a minimum value of the correlation values based on the accumulative value; and
controlling the focus lens based on the shift amount corresponding to the correlation value which is the minimum value in the search range.

15. The focusing control method according to claim 14, wherein the division area of which the accumulative value is equal to or less than a threshold value is determined as the search range.

16. The focusing control method according to claim 14, wherein the accumulative value of correlation values included in each of a plurality of division candidate areas obtained by dividing a candidate area of the search range in the direction of the first axis for each of the plurality of division candidate areas, the candidate area being the division area of which the accumulative value is equal to or less than a threshold value, and the search range is determined in the candidate area based on the accumulative value.

17. The focusing control method according to claim 14, wherein the plurality of division areas is three or more division areas, and
in a case where a number of the division areas, of which the accumulative value is equal to or less than a threshold value, is two or more and is less than a total number of the division areas, the search range is determined based on a positional relationship between the two or more division areas in the search range determining step.

18. The focusing control method according to claim 17, wherein, in a case where a division area, of which the accumulative value exceeds the threshold value, is present between the two or more division areas, a predetermined range in which a center is located at a position where the shift amount is zero is determined as the search range in the search range determining step.

19. The focusing control method according to claim 17, wherein, in a case where a plurality of continuously arranged division areas is present among the two or more division areas, the plurality of division areas is determined as the search range in the search range determining step.

20. The focusing control method according to claim 17, wherein, in a case where the number of the division areas, of which the accumulative value is equal to or less than the threshold value, is equal to a total number of the division areas, a predetermined range in which a center is located at a position where the shift amount is zero is determined as the search range in the search range determining step.

21. The focusing control method according to claim 14, wherein the plurality of division areas is three or more division areas, and
in a case where number of the division areas, of which the accumulative value is equal to or less than a threshold value, is equal to a total number of the division areas, a predetermined range in which a center is located at a position where the shift amount is zero is determined as the search range in the search range determining step.

22. The focusing control method according to claim 14, wherein, in the search range determining step, the search range is determined by comparing the accumulative values of the division areas with each other.

23. A non-transitory computer readable medium storing a focusing control program causing a computer to:
obtain correlation values between a first signal group output from a plurality of first signal detection sections, which receives one of a pair of luminous fluxes passing through different portions arranged in one direction of a pupil region of an imaging optical system including a focus lens and detects signals, and a second signal group output from a plurality of second signal detection sections, which receives other one of the pair of luminous fluxes and detects signals, for different shift amounts while shifting the first signal group and the second signal group in one direction by arbitrary amounts, the plurality of first signal detection sections and the plurality of second signal detection sections being formed in a focus detection area of a sensor,
obtain an accumulative value of the correlation values included in each of a plurality of division areas obtained by dividing a graph of the correlation values in which the shift amounts are represented on a first axis in a direction of the first axis, wherein the plurality of division areas represents the entire graph of the correlation values, wherein the graph of the correlation values includes the entire range of the obtained correlation values, and
perform focusing control by controlling the focus lens based on the accumulative value obtained.

* * * * *